US009372687B1

(12) United States Patent  (10) Patent No.: US 9,372,687 B1
Pai et al.  (45) Date of Patent: Jun. 21, 2016

(54) PRODUCT CUSTOMIZATION BASED ON USER CONTRIBUTIONS

(71) Applicants: Yogish Pai, Santa Clara, CA (US); Steve George Goyette, Maple Ridge (CA); Robert MacMartin, Delta (CA)

(72) Inventors: Yogish Pai, Santa Clara, CA (US); Steve George Goyette, Maple Ridge (CA); Robert MacMartin, Delta (CA)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 14/726,392

(22) Filed: May 29, 2015

(51) Int. Cl.
 *G06F 9/44* (2006.01)
(52) U.S. Cl.
 CPC ... *G06F 8/71* (2013.01); *G06F 8/10* (2013.01)
(58) Field of Classification Search
 None
 See application file for complete search history.

(56) References Cited

U.S. PATENT DOCUMENTS

| | | | | |
|---|---|---|---|---|
| 7,146,505 B1 * | 12/2006 | Harada | ............ | G06Q 20/206 705/18 |
| 7,774,349 B2 * | 8/2010 | Horvitz | ............ | G06Q 30/02 707/749 |
| 7,865,837 B1 * | 1/2011 | Huff | ............ | G06F 9/4443 715/781 |
| 8,082,193 B2 * | 12/2011 | Seeley | ............ | G06Q 20/102 705/30 |
| 2002/0178257 A1 * | 11/2002 | Cerrato | ............ | G06F 21/316 709/224 |
| 2004/0019540 A1 * | 1/2004 | William | ............ | G06Q 10/10 705/31 |
| 2005/0102283 A1 * | 5/2005 | Anderson | ............ | G06Q 40/02 |
| 2010/0058169 A1 * | 3/2010 | Demant | ............ | G06F 17/248 715/234 |
| 2011/0197124 A1 * | 8/2011 | Garaventa | ............ | G06F 17/30893 715/234 |
| 2012/0197685 A1 * | 8/2012 | Mays | ............ | G06Q 30/02 705/7.34 |
| 2012/0311135 A1 * | 12/2012 | DeLuca | ............ | G06F 9/44505 709/224 |
| 2014/0214637 A1 * | 7/2014 | Pai | ............ | G06Q 40/123 705/31 |
| 2014/0236464 A1 * | 8/2014 | Gueziec | ............ | G08G 1/0112 701/117 |

* cited by examiner

*Primary Examiner* — Chat Do
*Assistant Examiner* — Douglas Slachta
(74) *Attorney, Agent, or Firm* — Osha Liang LLP

(57) ABSTRACT

A method to customize an online software application. The method includes displaying, using a user interface of the online software application, a message inviting user contribution to a customizable component of the online software application, receiving, from an initial seed user via a network connection and in response to displaying the message, a structural specification of the customizable component suggested by the initial seed user according to a requirement based on an attribute of the initial seed user, determining that a new user of the online software application matches the attribute of the initial seed user, and configuring, based on the structural specification of the customizable component suggested by the initial seed user, an instantiation of the online software application for the new user to perform a pre-determined task according to the requirement.

17 Claims, 14 Drawing Sheets

Screenshot X 350

FIG. 3A

361 Data Entry Field

362 Action Button

Screenshot Y 360

FIG. 3B

PRODUCT CUSTOMIZATION BASED ON USER CONTRIBUTIONS

BACKGROUND

Local regulations and/or norms exist through out various geographical or jurisdictional regions for conducting business. A product marketed or used in each region needs to comply and/or support the local regulation/norm to be competitive. Similarly, different types of users of a product may have different requirements for various aspects of the product. A product targeting multiple types of users needs to support varying requirements of different types of users to be competitive. Internet based promotion and distribution have accelerated and broadened market reach of products to global customers. Customizing a product to support a wide range of regional requirements and satisfy vastly different types of users reachable via the Internet is a time consuming task. Techniques for customizing a product prior to the Internet era is not scalable to meet the challenges created by the Internet based promotion and distribution. Without overcoming these challenges, a global product targeting a vast number of different types of users across international regions can not compete with a local product focusing on a single type of users.

SUMMARY

In general, in one aspect, the invention relates to a method to customize an online software application. The method includes displaying, using a user interface of the online software application, a message inviting user contribution to a customizable component of the online software application, receiving, from an initial seed user via a network connection and in response to displaying the message, a structural specification of the customizable component suggested by the initial seed user according to a requirement based on an attribute of the initial seed user, determining that a new user of the online software application matches the attribute of the initial seed user, and configuring, based on the structural specification of the customizable component suggested by the initial seed user, an instantiation of the online software application for the new user to perform a pre-determined task according to the requirement.

In general, in one aspect, the invention relates to a system to customize an online software application. The system includes a computer server configured to execute a plurality of instantiations of the online software application, a user device coupled to the computer server via a network connection, wherein the user device is configured to display, using a user interface of the software application, a message inviting user contribution to a customizable component of the software application, a software application customizer executing on a computer processor and configured to receive, from the user device via the network connection and in response to displaying the message, a structural specification of the customizable component suggested by an initial seed user according to a requirement based on an attribute of the initial seed user, determine that a new user of the online software application matches the attribute of the initial seed user, and configure, based on the structural specification of the customizable component suggested by the initial seed user, an instantiation of the online software application for the new user to perform a pre-determined task according to the requirement, and a community data repository configured to store the structural specification and the plurality of structured contents.

In general, in one aspect, the invention relates to a non-transitory computer readable medium storing instructions to customize a software application. The instructions, when executed by a computer processor, include functionality for displaying, using a user interface of the online software application, a message inviting user contribution to a customizable component of the online software application, receiving, from an initial seed user via a network connection and in response to displaying the message, a structural specification of the customizable component suggested by the initial seed user according to a requirement based on an attribute of the initial seed user, determining that a new user of the online software application matches the attribute of the initial seed user, and configuring, based on the structural specification of the customizable component suggested by the initial seed user, an instantiation of the online software application for the new user to perform a pre-determined task according to the requirement.

Other aspects of the invention will be apparent from the following detailed description and the appended claims.

BRIEF DESCRIPTION OF DRAWINGS

FIGS. 3A, 3B, 3C, 3D, and 3E show an example of explicit contribution based customization in accordance with one or more embodiments of the invention.

DETAILED DESCRIPTION

Figure 1A:
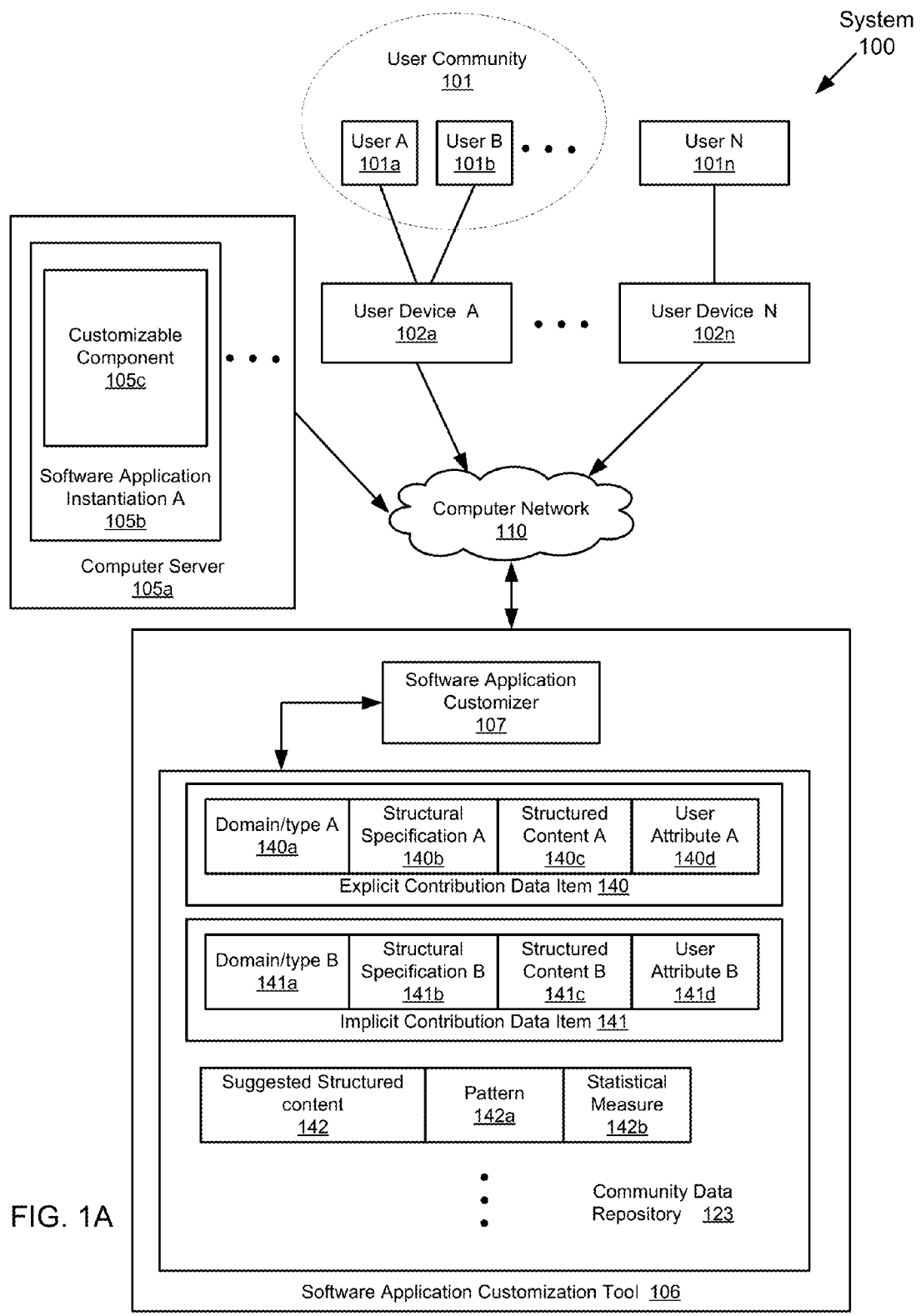
FIG. 1A shows a schematic diagram of a system for product customization based on user contributions in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In computing, the terms "internationalization" and "localization" refer to adapting computer software to different languages, regional differences, and regulatory requirements of a target market, such as a geographical or jurisdictional region. Internationalization is the process of designing a software application so that the application can be adapted to various regional requirements without substantial engineering changes. Localization is the process of adapting internationalized software for a specific region by adding locale-specific components and translating text based on a language specific to the region. Throughout this disclosure, the term "geographic region" refers to a region with a set of regulatory requirements/laws under the control of a system of courts or government entity which are different from neighboring regions. Generally, the regulatory requirements are imposed on local business entities to report various regulated aspects of their business activities on a periodic basis. For example, a tax jurisdiction corresponds to a region where the regulatory requirements include a set of tax laws under the control of local government entities. In one or more embodiments of the invention, the terms "internationalization" and "localization" also refer to adapting a hardware product to different languages, regional differences, and regulatory requirements of a target market, such as a geographical or jurisdictional region.

Embodiments of the invention provide a method, system, and computer readable medium for customizing a product based on user contributions. In one or more embodiments of the invention, a customizable component of the product is configured for a user based on customization of the product made by similar users. In one or more embodiments of the invention, the product may include hardware, software, or a combination thereof. In an example of software product, the customizable component of the product may correspond to a tax structure and/or a report layout of an internationalized online financial application that are configured in the localization process to comply with jurisdiction requirement of a geographic region.

FIG. 1A depicts a schematic block diagram of a system (100) in accordance with one or more embodiments of the invention. In one or more embodiments of the invention, one or more of the modules and elements shown in FIG. 1A may be omitted, repeated, and/or substituted. Accordingly, embodiments of the invention should not be considered limited to the specific arrangements of modules shown in FIG. 1A.

As shown in FIG. 1A, the system (100) includes a computer server (105a), users (e.g., user A (101a), user B (101b), user N (101n)) having user devices (e.g., user device A (102a), user device N (102n)), and a software application customization tool (106). Various components of the system (100) are coupled via a computer network (110). For example, the computer network (110) may include wired and/or wireless portions of public and/or private data network, such as wide area networks (WANs), local area networks (LANs), Internet, etc. Each of these components is described in detail below.

In one or more embodiments of the invention, the computer server (105a) includes hardware and software components for executing software application instantiations (e.g., software application instantiation A (105b), etc.) each includes a customizable component (e.g., customizable component (105c)). The software application instantiations (e.g., software application instantiation A (105b), etc.) may be copies of software application, such as an accounting software, a financial software, a web service, or any other online software product. The customizable component (e.g., customizable component (105c) may be a tax structure, a report layout, a calculation formula, or any other jurisdiction/region dependent component of the software application instantiations (e.g., software application instantiation A (105b), etc.). In addition, each of the users (e.g., user A (101a), user N (101n), etc.) launches the software application to execute one of the software application instantiations (e.g., software application instantiation A (105b), etc.) using respective user devices (e.g., user device A (102a), user device N (102n), etc.). In one or more embodiments, the user devices (e.g., user device A (102a), user device N (102n), etc.) may be a desktop computer, notebook computer, tablet computer, or other suitable mobile computing devices such as a smartphone.

In one or more embodiments, the software application instantiations (e.g., software application instantiation A (105b), etc.) is a web based application such that the users (e.g., user A (101a), user N (101n), etc.) interact with the software application instantiations (e.g., software application instantiation A (105b), etc.) using web browsers on respective user devices (e.g., user device A (102a), user device N (102n), etc.). In one or more embodiments, an instantiation of the software application (e.g., software application instantiation A (105b)) is downloaded onto a user device (e.g., user device A (102a)) where a user (e.g., user A (101a)) interacts with the downloaded instantiation of the software application via a user interface (UI) menu displayed on the user device (e.g., user device A (102a)).

In one or more embodiments, each of the customizable components (e.g., customizable component (105c)) is customized by one or more users (e.g., in the user community (101)) to configure a corresponding instantiation of the software application (e.g., software application instantiation A (105b)) for performing a pre-determined task. For example, the pre-determined task may include generating a sales or purchase document (e.g., invoice, purchase order, sales order, receipt, payment request, etc.), preparing a tax agency filing (e.g., income tax filing, sales tax filing, etc.), preparing an accounting report (e.g, proposal, quotation, billing statement, payable report, expense report, etc.), etc. according to tax jurisdiction requirements of a particular geographical region. For example, the customizable component may be a tax structure and performing the pre-determined task within the geographical region may include at least calculating a tax amount based on a customizable tax rate in the tax structure.

In one or more embodiments of the invention, users (e.g., user A (101a), user N (101n)) are individuals or business entities who use the aforementioned software application. Some users (e.g., user A (101a)) may be members of a user community (101). A user community may be, for example, a group of accountants working in the particular geographical region who jointly contribute to localization of the software application such that the resultant localized version of the software application is shared within the user community. In one or more embodiments, the users (e.g., user A (101a), user N (101n)) are equipped with computing and communication devices (e.g., user device A (102a), user device N (102n)) for interacting with the computer server (105a) and/or the software application customization tool (106). For example, the users (e.g., user A (101a), user N (101n)) may use the user devices (e.g., user device A (102a), user device N (102n)) to submit explicit contributions to localization of the software application. The explicit contributions may be submitted to the software application customization tool (106) directly, or indirectly via the computer server (105a). In one or more embodiments, the users (e.g., user A (101a), user N (101n)) use the user devices (e.g., user device A (102a), user device N (102n)) to access the computer server (105a) and manually customize the software application instantiations (e.g., software application instantiation A (105b), etc.). Information regarding such manual customization may be captured as implicit contributions to localization of the software application.

In one or more embodiments, the explicit and implicit contributions are stored in a community data repository (123) as contribution data items (e.g., explicit contribution data item (140), implicit contribution data item (141)). In one or more embodiments of the invention, the contribution data items are obtained/captured using the method described in reference to FIG. 2B below.

In one or more embodiments of the invention, the software application customization tool (106) includes a software application customizer (107) and a community data repository (123) for storing intermediate data and resultant outputs of the software application customizer (107). For example, the intermediate data and resultant outputs include the explicit contribution data item (140), the implicit contribution data item (141), and the suggested structured content (142) with associated pattern (142a) and statistical measure (142b), as described below. The community data repository (123) may include a disk drive storage device, a semiconductor storage device, other suitable computer data storage device, or combinations thereof.

In one or more embodiments of the invention, the explicit contribution data item (140) and the implicit contribution data item (141) include a body and associated metadata. The body includes a structural specification (e.g., structural specification A (140b), structural specification B (141b)) and a corresponding structured content (e.g., structured content A (140c), structured content B (141c)). In one or more embodiments, the structural specification is user submitted or automatically extracted data that specifies one or more elements of a customizable component (e.g., customizable component (105c)). In particular, the structural specification represents a suggestion from the user as to how the software application is to be customized based on a requirement of the user. In one or more embodiments, the structural specification further specifies relationships among multiple components of the customizable component (e.g., customizable component (105c)). For example, the structural specification may include a hierarchical structure, such as a data tree or a data graph. In one or more embodiments, the structured content is user submitted or automatically extracted data that contains values of the one or more elements specified in the structural specification. In one or more embodiments, the explicit contribution data item (140) is explicitly submitted by the user A (101a) where the structured content A (140c) may be omitted or incomplete. In other words, the structured content A (140c) may contain no information or contain values corresponding to an incomplete portion of the structural specification A (140b). In one or more embodiments, the implicit contribution data item (141) is automatically captured, without user intervention, from the customizable component (105c) that was previously customized based on inputs from the user B (101b) where the structured content B (141c) may be incomplete. In other words, the structured content B (141c) may contain values corresponding to an incomplete portion of the structural specification B (141b). In particular, the inputs correspond to the suggestion from the user B (101b) as to how the software application is to be customized based on a requirement of the user B (101b).

In one or more embodiments of the invention, the metadata associated with the explicit contribution data item (140) and the implicit contribution data item (141) includes a domain/type field and a user attribute field. The domain/type field may include user specified or automatically extracted information regarding the software application and the customizable component. For example, the domain/type field may include general information indicating accounting software, financial software, web service, applicable industry, and/or specific information that identifies the particular customizable component and the software application to be customized. The user attribute field may include user specified or automatically extracted information regarding the user associated with the particular contribution data item, such as industry, geographical location, type of business, profession, or other characteristics of the user.

In one or more embodiments of the invention, the suggested structured content (e.g., suggested structured content (142)) is aggregate and qualified data that contains values of the one or more elements specified in the structural specification (e.g., structural specification A (140b), structural specification B (141b)). For example, the suggested structured content (142) may include a qualified portion extracted from a collection of explicit and implicit contribution data items (e.g., explicit contribution data item (140), implicit contribution data item (141), etc.). In one or more embodiments, the suggested structured content (142) is extracted based on a pattern (142a) and/or a statistical measure (142b) found in the collection of explicit and implicit contribution data items (e.g., explicit contribution data item (140), implicit contribution data item (141), etc.). In one or more embodiments, the pattern (142a) is a statistic of the structural specification and/or structured content in the collection of explicit and implicit contribution data items. In one or more embodiments, the statistical measure (142b) is a statistic of users associated with the collection of explicit and implicit contribution data items. In one or more embodiments of the invention, the suggested structured content and associated pattern and statistical measure are generated from the collection of explicit and implicit contribution data items using the method described in reference to FIG. 2B below. In one or more embodiments of the invention, the suggested structured content and associated pattern and statistical measure are tagged with a corresponding user attribute (e.g., user attribute A (140d), user attribute B (141d)) and domain/type information (e.g., domain/type A (140a), domain/type B (141a)).

Figure 1B:
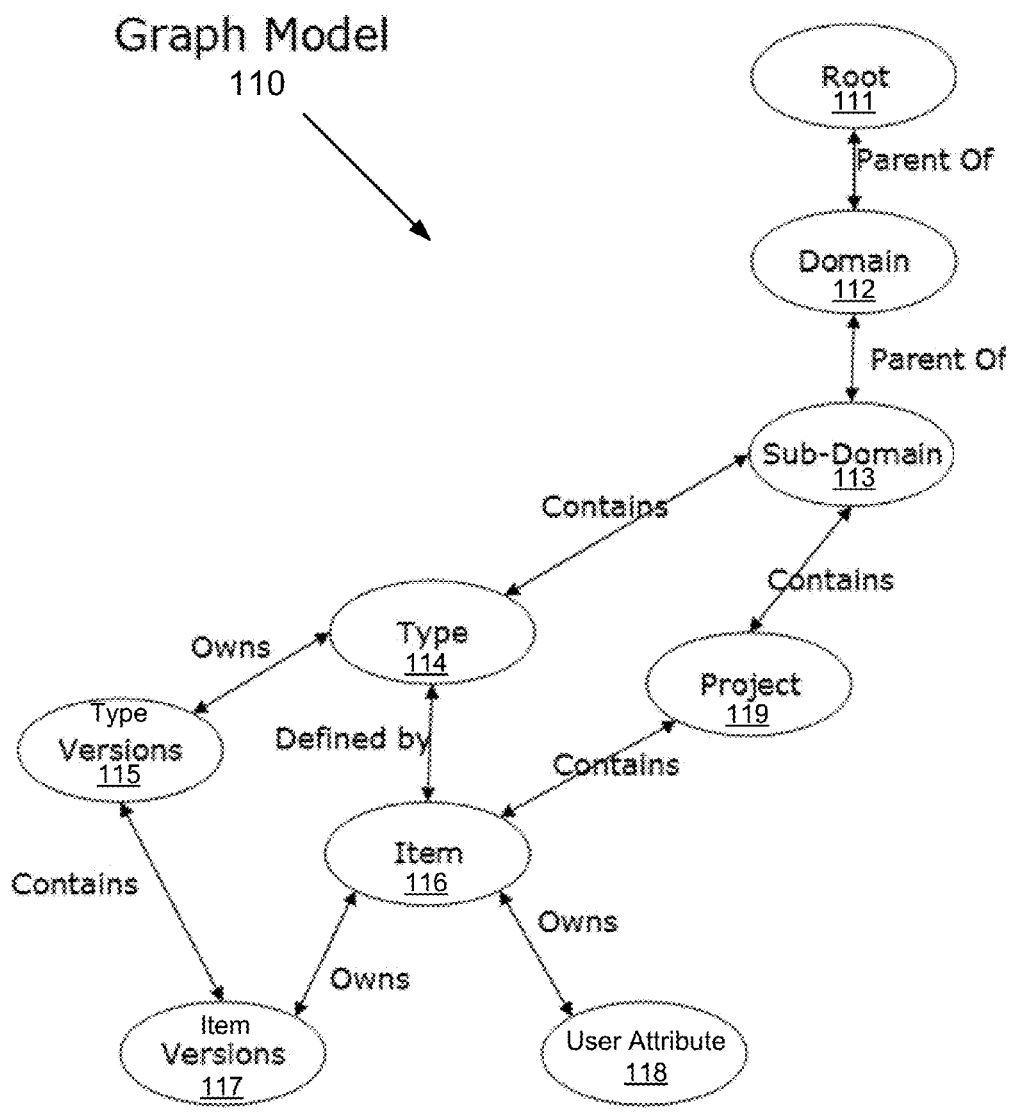
FIGS. 1B, 1C, and 1D show an example of explicit contribution data item and implicit data item in accordance with one or more embodiments of the invention.

In one or more embodiments of the invention, in the community data repository (123), one or more collections of explicit and implicit contribution data items (e.g., explicit contribution data item (140), implicit contribution data item (141), etc.) and one or more suggested structured contents (e.g., suggested structured content (142)) are organized based on a graph model, such as the graph model (110) shown in FIG. 1B. Specifically, the graph model (110) includes nodes and links connecting the nodes. As shown in FIG. 1B, the nodes include root (111), domain (112), sub-domain (113), type (114), type versions (115), item (116), item versions (117), user attribute (118), and project (119). In addition, the links may have different parent/child characteristics of a graph, such as parent of, contains, owns, defined by, etc. In one or more embodiments, information contained in the metadata's domain/type field of the explicit and implicit contribution data items (e.g., explicit contribution data item (140), implicit contribution data item (141), etc.) is organized using the domain (112), sub-domain (113), type (114), and type versions (115) in the graph model (110). In one or more embodiments, information contained in the metadata's user attribute field of the explicit and implicit contribution data items (e.g., explicit contribution data item (140), implicit contribution data item (141), etc.) is organized using the user attribute (118) in the graph model (110). In one or more embodiments, the structural specifications (e.g., structural specification A (140b), structural specification B (141b)) and structured contents (e.g., structured content A (140c), structured content B (141c)) are organized using the item (116) and item versions (117) in the graph model (110). In one or more embodiments, the suggested structured contents (e.g., suggested structured content (142)) and associated patterns (e.g., pattern (142a)) and statistical measures (e.g., statistical measure (142b)) are organized using the project (119) in the graph model (110). The term "project" refers to the activity of qualifying the explicit and implicit contribution data items based on the statistical measure, generating the suggested structured content that ensures the quality of the customized software application, and offering the customized software application to a new user.

Although FIG. 1B only shows one item node (i.e., item (116)) defined by the type (114) and only shows one type node (i.e., type (114) contained in the sub-domain (113), more than one item node may be defined by the type (114) and more than one type node may be contained in the sub-domain (113). Further, each node in the graph model (110) may store information as a data file, a linked list, a data sequence, a database, a graphical representation, or any other suitable data structure.

Figure 1C:
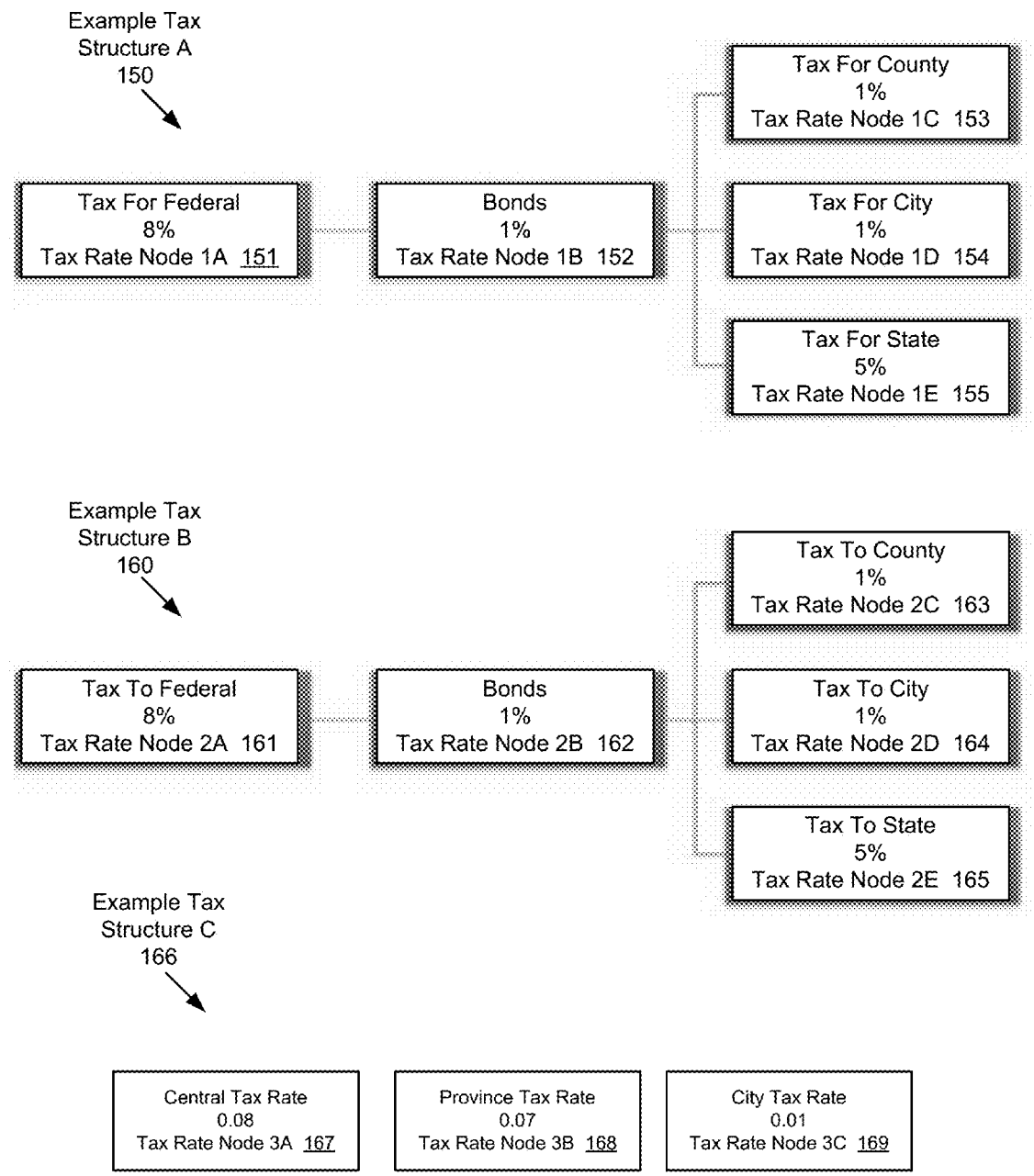

FIG. 1C shows examples of the structural specification (e.g., structural specification A (140b), structural specification B (141b)) and corresponding structured content (e.g., structured content A (140c), structured content B (141c)). In the example shown in FIG. 1C, the software application is an accounting software and the customizable component (105c) is a tax structure. The example tax structure A (150), example tax structure B (160), and example tax structure C (166) represent structural specifications and corresponding structured contents contributed by users to customize the customizable component (105c).

As shown in FIG. 1C, the example tax structure A (150) includes a hierarchical graph of tax rate nodes each having a user defined tax label and a corresponding numerical tax rate. In one or more embodiments, the numerical tax rate is a percentage. In one or more embodiments, the numerical tax rate is a flat currency amount. Specifically, the tax rate node 1A (151) includes the user defined tax label "Tax For Federal" and the numerical tax rate "8%," the tax rate node 1B (152) includes the user defined tax label "Bonds" and the numerical tax rate "1%," the tax rate node 1C (153) includes the user defined tax label "Tax For County" and the numerical tax rate "1%," the tax rate node 1D (154) includes the user defined tax label "Tax For City" and the numerical tax rate "1%," and the tax rate node 1E (155) includes the user defined tax label "Tax For State" and the numerical tax rate "5%." The hierarchical graph in the example tax structure A (150) without any numerical tax rate corresponds to an example of the structural specification. The collection of numerical tax rates in the example tax structure A (150) corresponds to an example of the structured content. Specifically, the example structural specification includes the structure of the tax rate nodes with user defined tax labels. The example structured content includes the numerical tax rates of the tax rate nodes.

In addition, the example tax structure B (160) includes a similar hierarchical graph of the tax rate node 2A (161) having the user defined tax label "Tax To Federal" and the numerical tax rate "8%," the tax rate node 2B (162) having the user defined tax label "Bonds" and the numerical tax rate "1%," the tax rate node 2C (163) having the user defined tax label "Tax To County" and the numerical tax rate "1%," the tax rate node 2D (164) having the user defined tax label "Tax To City" and the numerical tax rate "1%," and the tax rate node 2E (165) having the user defined tax label "Tax To State" and the numerical tax rate "5%." The hierarchical graph in the example tax structure B (160) without any numerical tax rate corresponds to another example of the structural specification. The collection of numerical tax rates in the example tax structure B (160) corresponds to another example of the structured content.

Further, the example tax structure C (166) includes tax rate node 3A (167) having the user defined tax label "Central Tax Rate" and the numerical tax rate "0.08," tax rate node 3B (168) having the user defined tax label "Province Tax Rate" and the numerical tax rate "0.07," and tax rate node 3C (169) having the user defined tax label "City Tax Rate" and the numerical tax rate "0.01." The collection of tax rate nodes in the example tax structure C (166) without any numerical tax rate corresponds to yet another example of the structural specification. The collection of numerical tax rates in the example tax structure C (166) corresponds to yet another example of the structured content.

The example tax structure A (150) and the example tax structure B (160) are created by two users of an accounting software application for computing applicable taxes for various tax agencies (e.g., Federal tax agency, Municipal tax agency, County tax agency, City tax agency, State tax agency, etc.) according to tax jurisdiction requirements of the particular geographical region (e.g., country) where the two users are located. Because the user has discretion in defining tax labels, the user defined tax labels from these two users who generated the graphical representations of the tax structures, although semantically consistent, have different wordings. Further, in one scenario, the tax structure C (166) may be created by a third user for a different transaction type or a different industry than the first two users in the same geographical region. In another scenario, the tax structure C (166) may be created by a third user who is in a different geographical region having a different tax jurisdiction requirement altogether. Further, as shown in FIG. 1C, the example tax structure A (150) and the example tax structure B (160) include hierarchical relationships among various tax rates, while the example tax structure C (166) does not include any relationship among tax rates. Said in other words, some tax structure may include only tax rates without specifying any relationships among them.

Returning to the discussion of FIG. 1A, in one or more embodiments of the invention, the software application customizer (107) includes a software component that is configured to receive, from a user device (e.g., user device A (102a)), a structural specification (e.g., structural specification A (140b)) suggested by an initial seed user (e.g., user A (101a)) to customize the software product according to a requirement based on an attribute (e.g., user attribute A (140d)) of the initial seed user (e.g., user A (101a)). In one or more embodiments, the software application customizer (107) is further configured to extract, from a customizable component (e.g., customizable component (105c)), a structured content (e.g., structured content B (141c)) used by a user (e.g., user B (101b)) to configure the corresponding software application instantiation (e.g., software application instantiation A (105b)) for performing the aforementioned pre-determined task. For example, the pre-determined task may be performed for the user B (101b) within a geographical region identified based on the user attribute B (141d). In one or more embodiments, the software application customizer (107) is further configured to generate the suggested structured content (142) with associated pattern (142a) and statistical measure (142b).

In one or more embodiments of the invention, the software application customizer (107) is further configured to determine a match between a new user (e.g., user N (101n)) and the structural specification (e.g., structural specification A (140b)) and/or the structured content (e.g., structured content B (141c)) based on their respective tagged attributes (e.g., user attribute A (140d), user attribute B (141d)). For example, the user N (101n)) is determined to be also in the same geographical region as the user A (101a) and/or the user B (101b)). Accordingly, the software application customizer (107) configures, at least based on the received structural specification (e.g., structural specification A (140b)) and/or the extracted structured content (e.g., structured content B (141c)), a software application instantiation (not shown) for the new user (e.g., user N (101n)) to perform the pre-determined task. For example, the pre-determined task is performed for the user N (101n) according to the requirement of the geographical region. In one or more embodiments, the software application customizer (107) configures the software application instantiation (not shown) for the new user (e.g., user N (101n)) based on the suggested structured content (142).

In one or more embodiments of the invention, the software application customizer (107) performs the aforementioned functionalities using the method described in reference to FIG. 2B below.

Figure 1D:
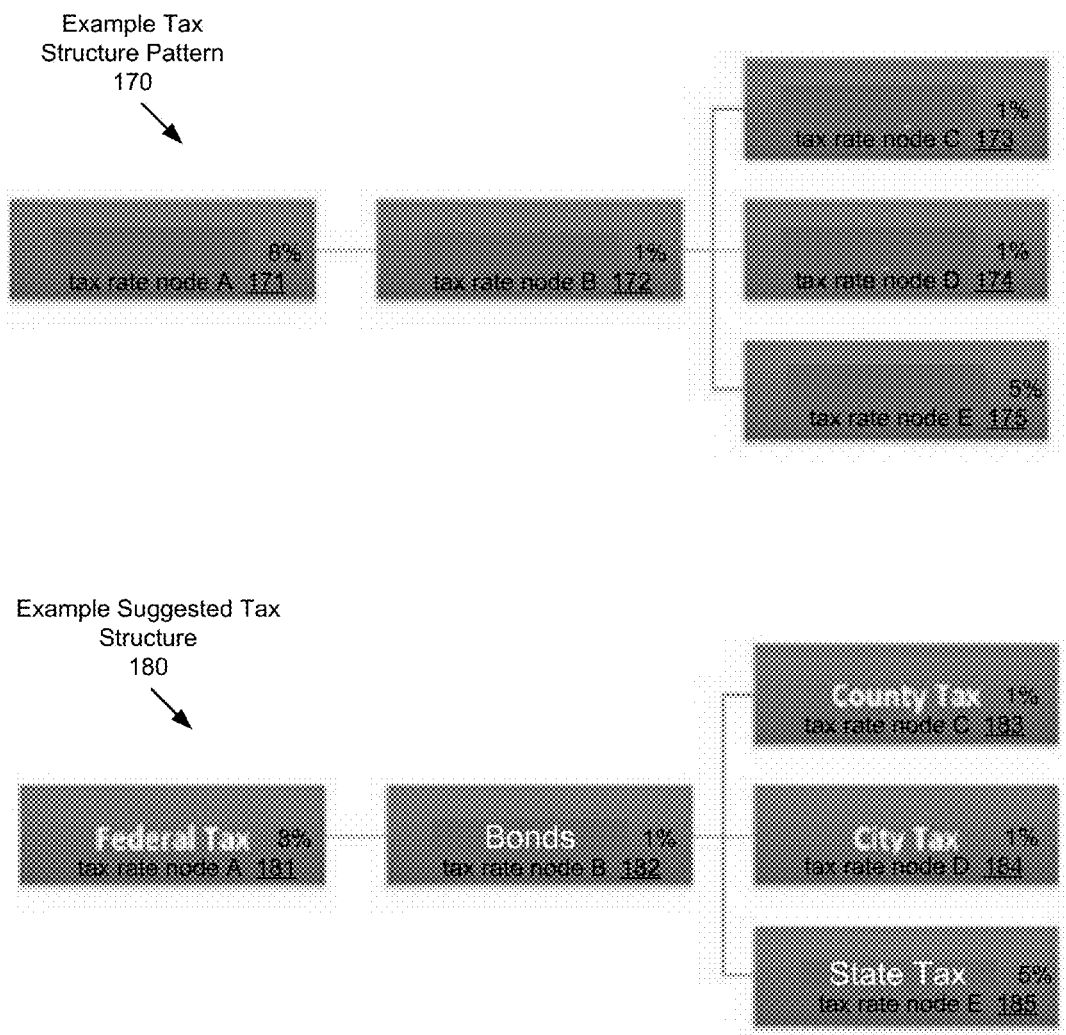

FIG. 1D shows an example of the suggested structured content (142) and associated pattern (142a) that is generated from at least the example tax structure A (150) and example tax structure B (160) shown in FIG. 1C above. Specifically, the example suggested tax structure (180) is an example of the suggested structured content (142) depicted in FIG. 1A above. The example tax structure pattern (170) is an example of the pattern (142a) depicted in FIG. 1A above.

As shown in FIG. 1D, the example tax structure pattern (170) includes a hierarchical graph of tax rate nodes each having a numerical tax rate. Specifically, the tax rate node A (171) includes the numerical tax rate "8%," the tax rate node B (172) includes the numerical tax rate "1%," the tax rate node C (173) includes the numerical tax rate "1%," the tax rate node D (174) includes the numerical tax rate "1%," and the tax rate node E (175) includes the numerical tax rate "5%." In particular, these tax rates are the same as corresponding ones in both the example tax structure A (150) and the example tax structure B (160) depicted in FIG. 1C above. Thus, the hierarchical graph depicted in FIG. 1E is the common pattern observed in both hierarchical graphs of the example tax structure A (150) and the example tax structure B (160) depicted in FIG. 1C above. In one or more embodiments, the common pattern is automatically identified by analyzing the numerical tax rates and semantic meanings of the corresponding user defined tax labels in each hierarchical level separately in the tax structures. In one or more embodiments, the common pattern is automatically identified by analyzing the numerical tax rates and semantic meanings of the corresponding user defined tax labels regardless of any hierarchical level in the tax structures. Although the example tax structure pattern (170) includes hierarchical relationships among various tax rates, other example tax structure pattern may not include any relationship among tax rates. Said in other words, some tax structure pattern may include only tax rates without specifying any relationships among them. For example, any pattern that may be derived from example tax structure C (166) depicted in FIG. 1C may not include any relationship among tax rates.

Further as shown in FIG. 1D, the example suggested tax structure (180) is essentially the same as the example tax structure pattern (170) with the exception that each of the numerical tax rates is assigned a system defined tax label. Specifically, the tax rate node A (181) includes the numerical tax rate "8%" assigned a system defined tax label "Federal Tax," the tax rate node B (182) includes the numerical tax rate "1%" assigned a system defined tax label "Bonds," the tax rate node C (183) includes the numerical tax rate "1%" assigned a system defined tax label "County Tax," the tax rate node D (184) includes the numerical tax rate "1%" assigned a system defined tax label "City Tax," and the tax rate node E (185) includes the numerical tax rate "5%" assigned a system defined tax label "State Tax." In particular, the system defined tax label "Federal Tax" are automatically generated by analyzing corresponding user defined tax labels "Tax For Federal" and "Tax to Federal" found in the tax rate node 1A (151) and the tax rate node 2A (161), respectively. Similarly, the other system defined tax labels "Bonds," "County Tax," "City Tax," and "State Tax" are automatically generated by analyzing corresponding user defined tax labels found in the tax rate node 1A (151) and the tax rate node 2A (161) depicted in FIG. 1C. In one or more embodiments, the system defined tax labels are automatically generated by analyzing user defined tax labels in each hierarchical level separately in the tax structures. In one or more embodiments, the system defined tax labels are automatically generated by analyzing user defined tax labels regardless of any hierarchical level in the tax structures. Although the example suggested tax structure (180) includes hierarchical relationships among various tax rates, other example suggested tax structures may not include any relationship among tax rates. Said in other words, some suggested tax structures may include only tax rates assigned with system defined tax labels without specifying any relationships among the tax rates.

Although the example tax structures shown in FIGS. 1C and 1E are based on income taxes, the tax structures may also include sales taxes or any other type of taxes. In addition to the name of the tax, each tax in the example tax structures shown in FIGS. 1C and 1E may also be tagged with additional information, such as name of collecting agency, type of tax, effective date(s) of tax rate, method of calculating tax, applicable tax return form, goods and/or services that a tax rate is applicable to, income and/or expenses that a tax rate is applicable to, etc. Further, the example tax structures may also include grouped tax rates, which are combinations of tax rates from different taxes. In particular, a grouped tax rate may be used to charge multiple taxes (e.g., levied over goods, service, income, expense, or any other taxable item) during a single transaction.

Figure 2A:
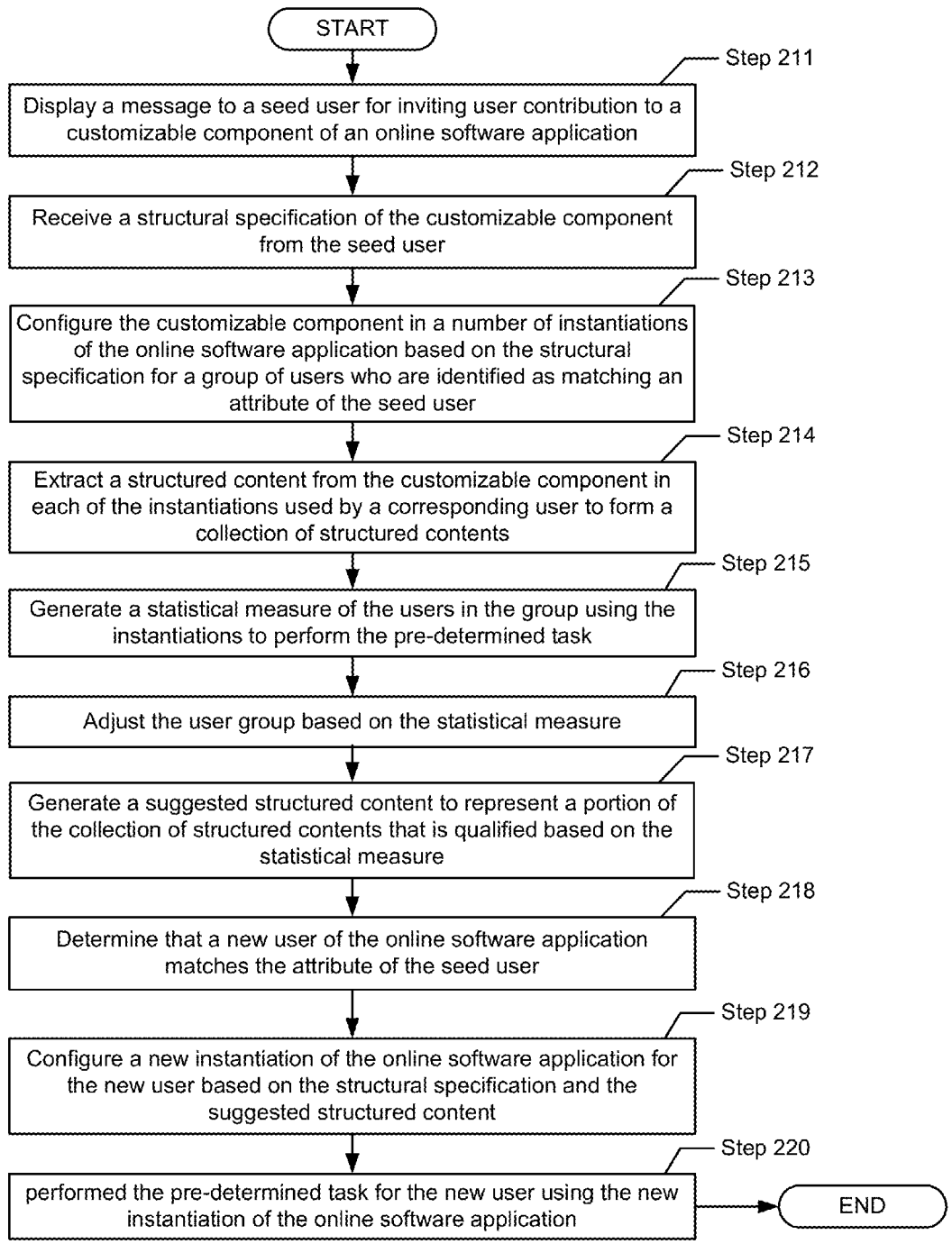
FIGS. 2A and 2B show flowcharts of a method for product customization based on user contributions in accordance with one or more embodiments of the invention.

FIG. 2A depicts a flowchart of a method in accordance with one or more embodiments of the invention. In one or more embodiments of the invention, one or more of the steps shown in FIG. 2A may be omitted, repeated, and/or performed in a different order. Accordingly, embodiments of the invention should not be considered limited to the specific arrangements of steps shown in FIG. 2A. In one or more embodiments, the method described in reference to FIG. 2A may be practiced using the system (100) described in reference to FIG. 1A above.

As noted above, techniques for customizing products prior to the Internet era is not scalable to meet the challenges created by the Internet based promotion and distribution. Without overcoming these challenges, a global product targeting a vast number of different types of users across international regions can not compete with a local product focusing on a single type of users. The method described in the flowchart (210) addresses the aforementioned challenges by employing a crowd sourcing technique that is rooted in the Internet technology. Generally, crowd sourcing is the process of obtaining needed services, ideas, or content by soliciting contributions from a large group of people, and especially from an online community, rather than from traditional employees or suppliers. In particular, crowd sourcing is distinguished from out sourcing in that the work comes from an undefined public rather than being commissioned to a specific, named group. Because the result of generic crowd sourcing comes from the undefined public, it is important to monitor the process and maintain the quality of the result. In one or more embodiments of the invention, the method described in the flowchart (210) employs a statistical qualification procedure to ensure the quality of customizing a product using the crowd sourcing technique. Specifically, the product is an online software application.

Initially in Step 211, a message is displayed to a user (referred to as the initial seed user) inviting user contribution to a customizable component of the online software application. In one or more embodiments of the invention, the message is displayed using a user interface of the online software application.

In one or more embodiments, prior to displaying the message, a selection menu is displayed, using the user interface, for the initial seed user to select a particular customization from a set of customizations already supported by the online software application. In response, a selection is received from the initial seed user indicating that the customization desired by the initial seed user is not yet supported by the online software application and is not included in the selection menu. Accordingly, the message is displayed to invite the initial seed user to submit a suggestion to the customizable component of the online software application to implement the customization desired by the initial seed user.

In Step 212, in response to displaying the message, a structural specification of the customizable component is received from the initial seed user. Specifically, the structural specification is suggested by the initial seed user according to a requirement based on an attribute of the initial seed user. In other words, the customization desired by the initial seed user allows the online software application to meet/satisfy the requirement. For example, the customized instantiation of the software application may perform a pre-determined task in a way that meets/satisfies the requirement. In one or more embodiments, a structured content corresponding to at least a portion of the structural specification is also received from the initial seed user. In one or more embodiments, no structured content corresponding to the structural specification is received from the initial seed user.

In one or more embodiments of the invention, the attribute of the initial seed user specifies a geographical region of the user. For example, the requirement may be a regulatory requirement or a product functionality requirement of the geographical region. In one or more embodiments of the invention, the attribute of the initial seed user and additional context information are combined with the structural specification as an explicit contribution data item for storing in a community database. For example, the context information may include domain/type information regarding the online software application and/or the customizable component. In one or more embodiments, the explicit contribution data item also includes the structured content if available. In one or more embodiments of the invention, the associations between the structural specification, the structured content, the initial seed user, the attribute of the initial seed user, and the context information are organized using the type node, the item node, and the user attribute node in the graph model.

In Step 213, a group of users are identified based on the attribute of the initial seed user. In particular, each user in the group shares the same attribute (e.g., industry, geological region, type of business, profession, etc.) as the initial seed user. Accordingly, a number of instantiations of the online software application are configured for the group of users based on the structural specification of the customizable component received from the initial seed user. In other words, the customizable component in each instantiation of the online software application used by any user in the group is customized according to the structural specification suggested by the initial seed user. As noted above, the structural specification specifies one or more elements, and relationships thereof, of the customizable component without specifying actual values of the one or more elements. Subsequent to customizing the customizable component according to the structural specification suggested by the initial seed user, each user in the identified user group may individually and independently specify actual values of the one or more elements in the customizable component. In other words, some users in the identified user group may individually and independently specify different values for the same element, while other users may individually and independently specify the same values for the same element. In one or more embodiments, the values specified by a user is used to further configure the corresponding instantiation for performing the pre-determined task in a way that meets/satisfies a requirement of the user.

In Step 214, from the customizable component in each of the instantiations used by users in the group, a structured content is extracted. Specifically, the extracted structured content contains the values specified by a corresponding user in Step 213. In particular, the structured content represents what the values of the one or more elements of the customizable component, as specified in the structural specification, should be such that the pre-determined task is performed in a way that meets/satisfies the requirement of the corresponding user. The structured contents extracted from all instantiations used by all users in the group are collected into a collection of structured contents. In one or more embodiments of the invention, the attribute of the users and additional context information are combined with the structured contents as implicit contribution data items for storing in the community database. For example, the context information may include domain/type information regarding the online software application and/or the customizable component. In one or more embodiments of the invention, the associations between the collection of structured contents, the user group, the initial seed user, the explicit contribution data item are organized using the type node and the item node in the graph model.

In Step 215, a statistical measure of the users in the group using the instantiations to perform the pre-determined task is generated. In one or more embodiments of the invention, the statistical measure represents a level of quality of the collection of structured contents contributed by the group of users.

In Step 216, the user group is adjusted to remove certain users until the statistical measure corresponding to the adjusted group exceeds a pre-determined threshold. In one or more embodiments of the invention, adjusting the user group corresponds to qualifying or filtering the corresponding collection of structured contents. An example of adjusting the user group for qualifying or filtering the corresponding collection of structured contents is described in reference to FIG. 2B below.

In Step 217, in response to the statistical measure exceeding a pre-determined threshold, a suggested structured content is generated to represent a portion of the collection of structured contents that is qualified based on the statistical measure. In other words, the suggested structured content represents a portion of the collection of structured contents that is qualified to achieve a particular level of quality. In one or more embodiments of the invention, the suggested structured content is tagged with the attribute of the initial seed user that is shared by users in the user group. In addition, the suggested structured content is stored in the community database. In one or more embodiments of the invention, the associations between the suggested structured content, the statistical measure, the adjusted user group, the initial seed user, and the explicit and implicit contribution data items are organized using the project node in the graph model.

In Step 218, a new user of the online software application is determined as matching the attribute of the initial seed user. Accordingly, the structural specification of the customizable component suggested by the initial seed user and the suggested structured content qualified based on the statistical measure are identified. In one or more embodiments of the invention, the structural specification and the suggested structured content are identified in the community database based on the type node, item node, user attribute node, and project node in the graph model.

In Step 219, based on the structural specification of the customizable component suggested by the initial seed user and the suggested structured content qualified based on the statistical measure, an instantiation of the online software application is configured for the new user.

In Step 220, the pre-determined task is performed for the new user using the instantiation of the online software application configured in Step 219.

In one or more embodiments of the invention, the structural specification may subsequently be revised by another user (referred to as a subsequent seed user) different than the initial seed user. Accordingly, Step 213 through Step 220 are performed for another user group and another new user based on the user attribute of the subsequent seed user. In one or more embodiments of the invention, the user attribute identifies a geographical region. In such embodiments, the initial seed user and the associated user group are within the same geographical region based on their matching user attributes. Accordingly, the initial seed user and the associated user group contribute to customization of the online software application to support local and/or jurisdiction requirement of the geographical region. Specifically, the initial seed user contributed explicitly while the associated user group contributed implicitly. Further, the subsequent seed user and the another user group are within another geographical region based on their matching user attributes. Accordingly, the subsequent seed user and the another user group contribute to customization of the online software application to support local and/or jurisdiction requirement of the another geographical region. In one or more embodiments of the invention, using the method described above, the online software application is internationalized for localizing to multiple geographical regions, such as the geographical region of the initial seed user as well as the another geographical region of the subsequent seed user.

Figure 2B:
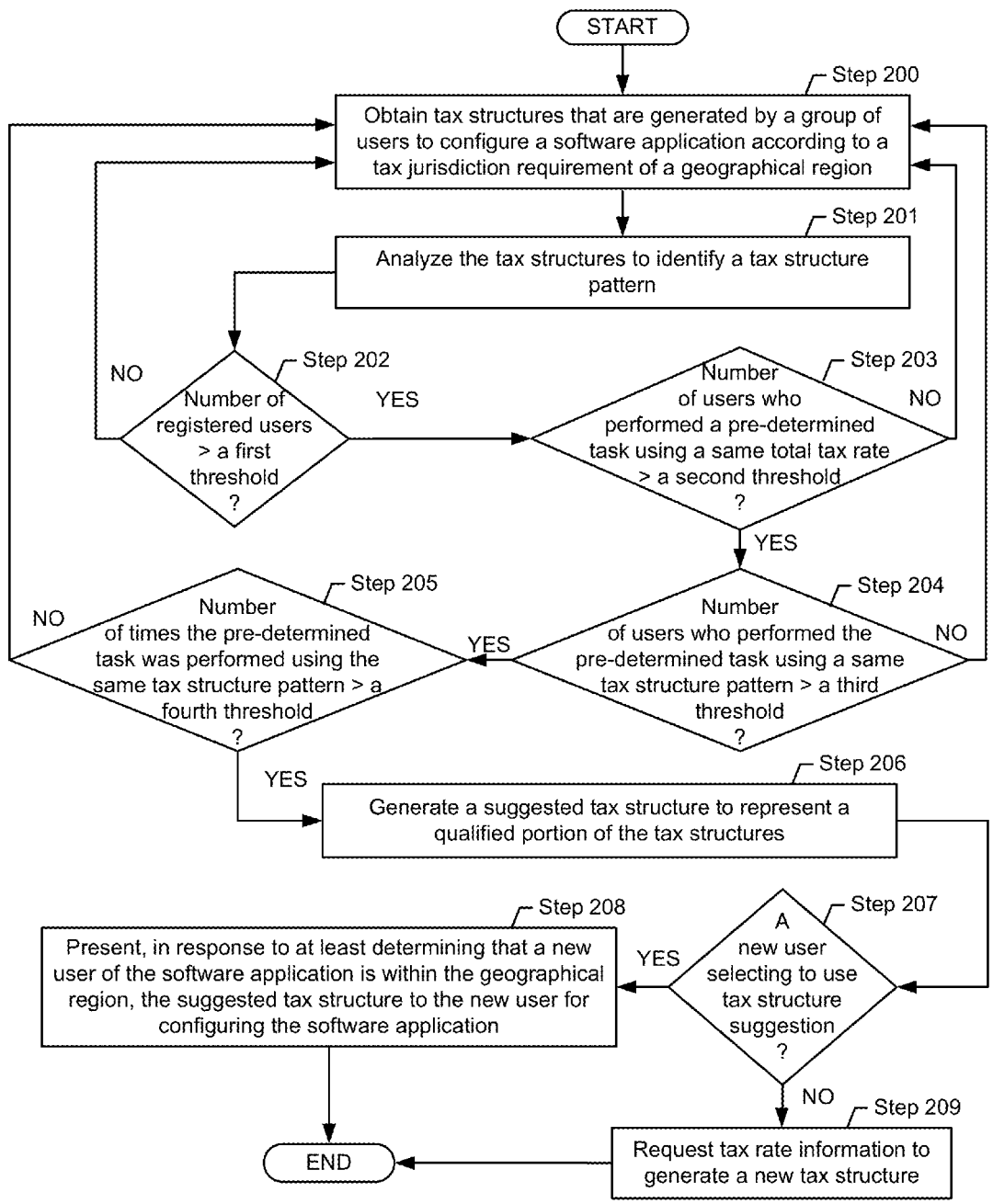

FIG. 2B depicts a flowchart of a method in accordance with one or more embodiments of the invention. In particular, the method flowchart described in FIG. 2B is an example of Step 214 through Step 219 shown in FIG. 2A above. Specifically, in the example described in reference to FIG. 2B, the online software application is an accounting software, the customizable component is a tax structure, and the user attribute is the geographical region. In one or more embodiments of the invention, one or more of the steps shown in FIG. 2B may be omitted, repeated, and/or performed in a different order. Accordingly, embodiments of the invention should not be considered limited to the specific arrangements of steps shown in FIG. 2B. In one or more embodiments, the method described in reference to FIG. 2B may be practiced using the system (100) described in reference to FIG. 1A above.

Initially in Step 200, tax structures of a software application are obtained from a group of users. For example, the software application may be an accounting software, while the tax structures may be those described in reference to FIGS. 1C and 1D above. In particular, the software application is used by the group of users to perform a pre-determined task, such as generating an invoice, an accounting report, or a tax agency filing. In one or more embodiments, the tax structures are generated by the group of users according to a tax jurisdiction requirement of a geographical region. Specifically, each of the tax structures includes one or more tax rates and is used by a user of the group to configure an instantiation of the software application for performing the pre-determined task in compliance with the tax jurisdiction requirement. For example, generating the invoice, accounting report, or tax agency filing includes calculating a tax amount based on a tax rate of the tax structures that is dictated by the tax jurisdiction.

In one or more embodiments, the group of users is identified based on a total tax rate that is the same for each of the tax structures, where the total tax rate is a sum of every tax rate included in the each of the tax structures. In one or more embodiments, the group of users is identified based on a same number of tax rates in each of the tax structures, where each tax rate in a particular tax structure is identified by a user defined tax label specific to that particular tax structure. In one or more embodiments, the group of users is identified based on a tax structure pattern that is the same for each of the tax structures, where the tax structure pattern includes every tax rate included in each of the tax structures. In one or more embodiments, the group of users is identified based on an industry designation in a user profile of each user. Said in other words, the group of users is identified such that their tax structures all have a same total tax rate, a same number of tax rates, and/or a same tax rate pattern. Further, the group of users may be qualified based on their industry association.

In Step 201, the tax structures are analyzed to identify a tax structure pattern. For example, the tax structure pattern may be among those described in reference to FIGS. 1A to 1D above. In one or more embodiments, it is first determined that every tax structure includes a same number of tax rates and a same total tax rate. As noted above, the total tax rate is a sum of every tax rate in any one of the tax structures, where each tax rate in a particular tax structure is identified by a user defined tax label specific to that particular tax structure.

Because the user defined tax labels are defined based on user discretion, the user defined tax labels from different users, although semantically consistent, may have different wordings. After determining that every tax structure includes a same number of tax rates and a same total tax rate, the user defined tax labels tagging on tax rates of the same percentage value are analyzed to identify their semantic meaning(s). Generally, the tax rates in these tax structures can be categorized based on different semantic meanings of the user defined tax labels.

In one or more embodiments, the user defined tax labels for every tax rate in these tax structures that have a same percentage value are analyzed to identify one or more tax categories. In particular, each tax category represents those user defined tax labels that are semantically equivalent with respect to the tax jurisdiction requirement of the geographical region. Accordingly, each tax category identifies a single tax rate specified by the tax jurisdiction requirement. In one or more embodiments, the tax rates for all identified tax categories form a tax structure pattern. For example, the tax structure pattern may include a sequence of tax rates each associated with one of the identified tax categories. In another example, the tax structure pattern may include tax rates associated with the identified tax categories without any sequencing or hierarchical information.

In one or more embodiments, those tax structures sharing the same tax structure pattern but having different wordings in their particular user defined tax labels are considered as equivalent tax structures. In one or more embodiments, equivalent tax structures are represented by a single representative tax structure that includes the common tax structure pattern where the tax rate of each tax category in the common tax structure pattern is assigned a system defined tax label. For example, the system defined tax label may be defined based on the equivalent semantic meaning of the user defined tax labels and represent a respective tax dictated by the tax jurisdiction requirement of the geographical region. In one or more embodiments, a representative tax structure is provided to a new user as a suggested tax structure based on certain pre-determined statistical measures described in Steps 202 through 205 below. In particular, these statistical measures relate to the group of users (referred to as the user group) and a number of times the pre-determined task is performed by the group of users.

In Step 202, a determination is made as to whether the number of registered users who have paid for the software application in the user group exceeds a first threshold. In one or more embodiments, the registered users also include those who received a free copy of the software application under a pre-determined license agreement. If the answer is no, the method returns to Step 200 to collect additional tax structures from addition users. If the answer is yes, the method proceeds to Step 203. In one or more embodiments, the number of users in the user group regardless of their registration status may be used as the criterion.

In Step 203, a determination is made as to whether the number of users in the user group who have performed the pre-determined task based on the same total tax rate exceeds a second threshold. If the answer is no, the method returns to Step 200 to collect additional tax structures from addition users. If the answer is yes, the method proceeds to Step 204. In one or more embodiments, users may be weighted differently based on user attributes in counting the number of users.

The user attributes may include professional designation of the user, geographical location of the user, tax jurisdiction of the user, job title of the user, industry of the user, goods/services provided or purchased by the user, income and/or expenses recorded or claimed by the user, assets and liabilities of the user, tax status of the user (e.g., self-reported tax status, registrations with tax agencies, exemptions from tax agencies, etc.), tax return filing count and/or frequency of the user, type of tax-related activities performed by the user in the software, length of time the user has been using the software application, number of times the user has logged into the software application, how long the user has been renewing the license of the software application, etc. For example, an accountant may be counted as 1.5 users such that tax structures from accountants may be emphasized (i.e., assigned more weight) than those from ordinary users.

In Step 204, a determination is made as to whether the number of users in the user group who have performed the pre-determined task based on the same tax structure pattern exceeds a third threshold. If the answer is no, the method returns to Step 200 to collect additional tax structures from addition users. If the answer is yes, the method proceeds to Step 205.

In Step 205, a determination is made as to whether the number of times that the pre-determined task has been performed by the user group based on the same tax structure pattern exceeds a fourth threshold. If the answer is no, the method returns to Step 200 to collect additional tax structures from addition users. If the answer is yes, the method proceeds to Step 206.

In Step 206, a suggested tax structure is generated to represent a qualified portion of the tax structures. Specifically, the qualified portion of the tax structures includes those tax structures that meet the criterion of the Steps 202 through 205. Said in other words, the aforementioned representative tax structure is qualified as the suggested tax structure when all criterions in these Steps are met.

In Step 207, a determination is made as to whether a new user has selected to use tax structure suggestion or not. In particular, the user selection is received when the new user is configuring the software application, for example, to generate an invoice, an accounting report, a tax agency filing, etc. If the answer is no, the method proceeds to Step 209, where a user interface window is presented to the new user requesting tax rate information for generating a new tax structure. If the answer is yes, the method proceeds to Step 208 where the suggested tax structure is presented to the new user in response to at least determining that the new user is configuring the software application within the geographical region of the suggested tax structure. In this manner, the new user can generate the invoice, accounting report, tax agency filing, etc. in compliance to the tax jurisdiction of the geographical region.

As described above, the Steps 200 through 208 may be performed separately for user groups involved with different transaction types, performed separately for user groups in different industries, and performed separately for user groups in different geographical regions regulated by different tax jurisdictions. Accordingly, the process of FIG. 2B may be repeated based on one or more distinctions as described above.

FIGS. 3A-3E show an application example of explicit contribution based customization in accordance with one or more embodiments of the invention. This application example may be practiced using the system (100) of FIG. 1A and based on the method described with respect to FIG. 2A above.

Figures 3A, 3B:
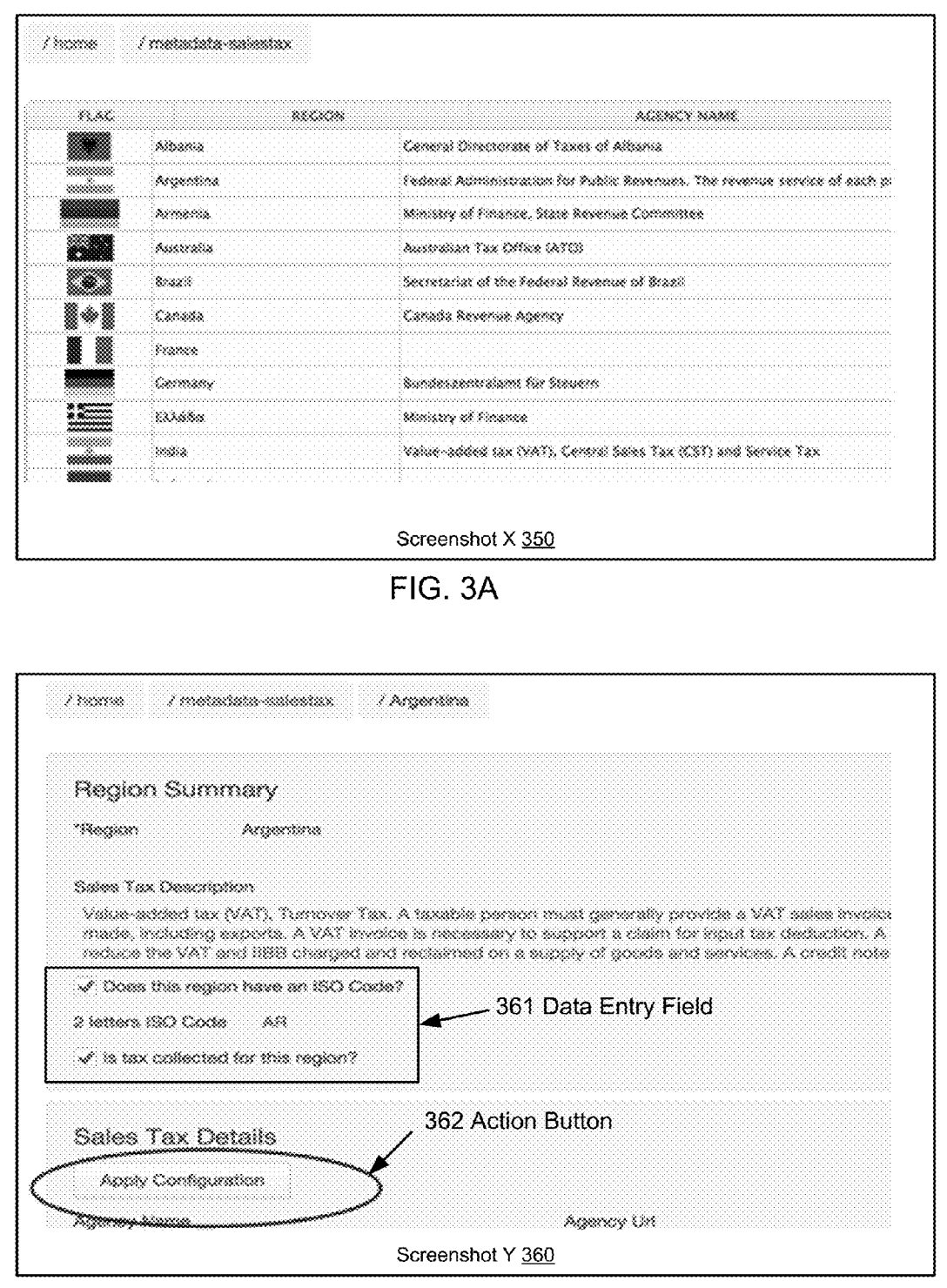

FIG. 3A shows a screenshot X (350) of a user interface selection menu in an accounting software. Specifically, the user interface selection menu lists all countries where local tax structures are already supported by the accounting software. In particular, the user interface selection menu allows a user (referred to as the seed user) to select and edit any tax structure listed in the user interface menu or to create a tax structure template for a country that is not yet supported by the accounting software. As noted above, the tax structure is a customizable component in the accounting software and is identified in a community database using a type node in a graph model.

In one scenario shown in the screenshot X (350), the seed user selects to edit the tax structure for Argentina. In this scenario, the user interface redirects to another screen shown in FIG. 3B. In another scenario shown in the screenshot X (350), the seed user selects to create a tax structure template for a region referred to as "NewRegion". In this scenario, the user interface redirects to another screen shown in FIG. 3C.

FIG. 3B shows a screenshot Y (360) of a user interface configuration menu in the accounting software. Specifically, the user interface configuration menu includes a data entry field (361) that allows the seed user to change how value added tax (VAT) is processed by the accounting software for transactions conducted within Argentina. Once one or more check boxes are changed, the seed user may activate an action button (362) to apply the change. The applied change is then stored in the community database as an explicit contribution data item that is organized using an item node in the graph model.

Figure 3C:
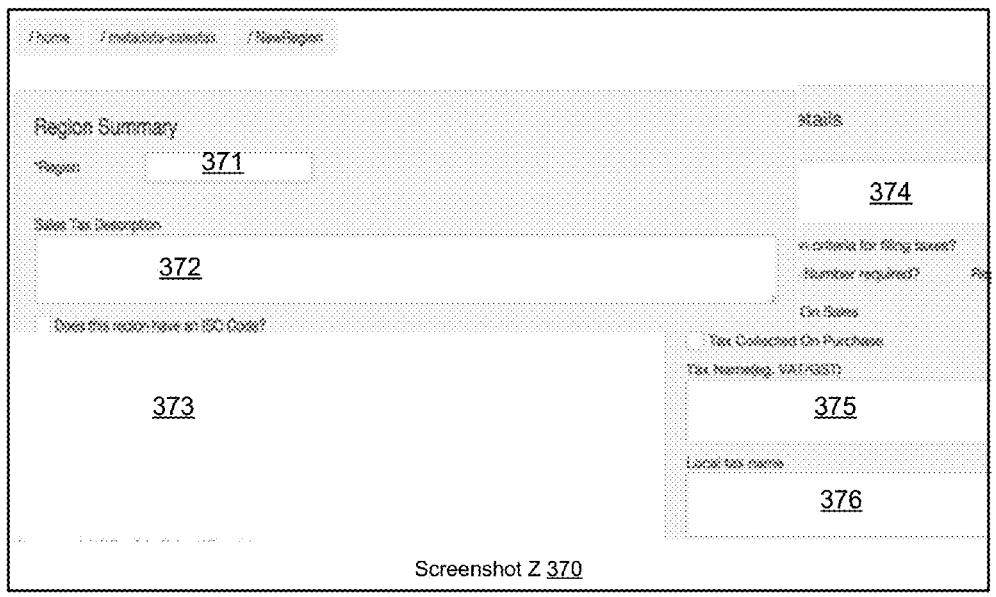

FIG. 3C shows a screenshot Z (370) of a user interface configuration menu in the accounting software. Specifically, the user interface configuration menu includes various data entry fields (371), (372), (373), (374), (375), (376), etc. that allow the seed user to create a new tax structure for the accounting software applicable for transactions conducted within the NewRegion. The new tax structure is then stored in the community database as another explicit contribution data item that is organized using another item node in the graph model.

Figure 3D:
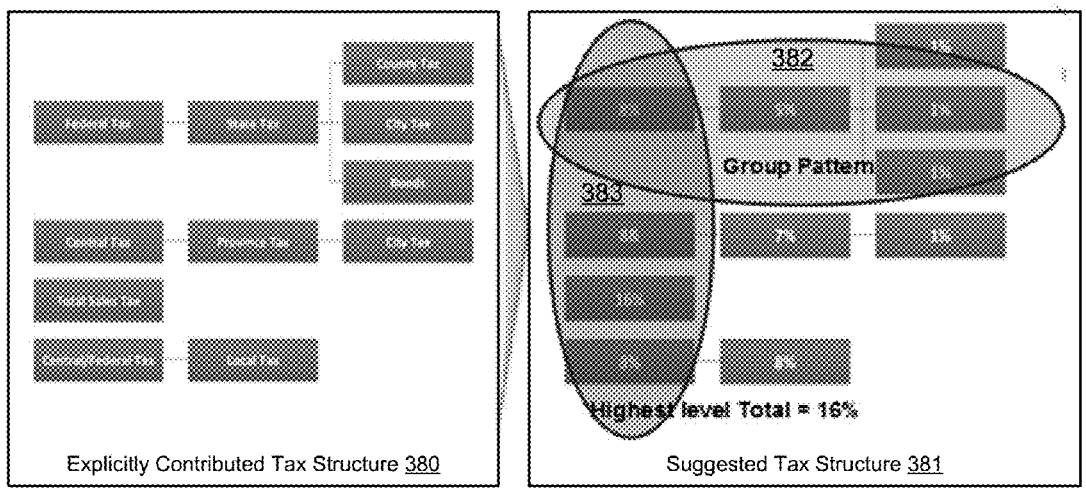

FIG. 3D shows an example of an explicitly contributed tax structure (380) that is either revised based on the explicit contribution data item described in FIG. 3B or created based on the explicit contribution data item described in FIG. 3C. As shown in FIG. 3D, the explicitly contributed tax structure (380) includes multiple elements with specified relationships among the elements and without any value associated with the elements. In other words, the explicitly contributed tax structure (380) is an example of the structural specification described above.

Whether the explicit contribution data item includes a seed user revision to the tax structure described in FIG. 3B or a seed user created new tax structure template described in FIG. 3C, a software localization project may then be initiated by applying a qualifying criteria to the explicit contribution data item. For example, a reviewer user may manually review the explicit contribution data item in the community database and may decide to initiate the localization project. In another example, the localization project may be automatically initiated when a number of similar explicit contribution data items detected in the community database exceeds a pre-determined limit (e.g., 5, 10, or other pre-defined number). For example, the localization project may be automatically initiated when 5 or more seed users submitted same VAT changes via the user interface configuration menu shown in FIG. 3B.

As described above, the localization project is added to the graph model as a project node. For example, the localization project may be assigned to a central engineering team as a market requirement document that is to be implemented as a new addition to the user interface selection menu depicted in FIG. 3A. In another example, the localization project is implemented automatically using the method described in FIG. 2B above. In other words, implicit contribution data items are extracted to generate an suggested tax structure (381). For example, the implicit contribution data items may include the structured content (382) and structured content (383). An example of extracting implicit contribution data items to generate the suggested tax structure is described in reference to FIGS. 4A-4D below.

Figure 3E:
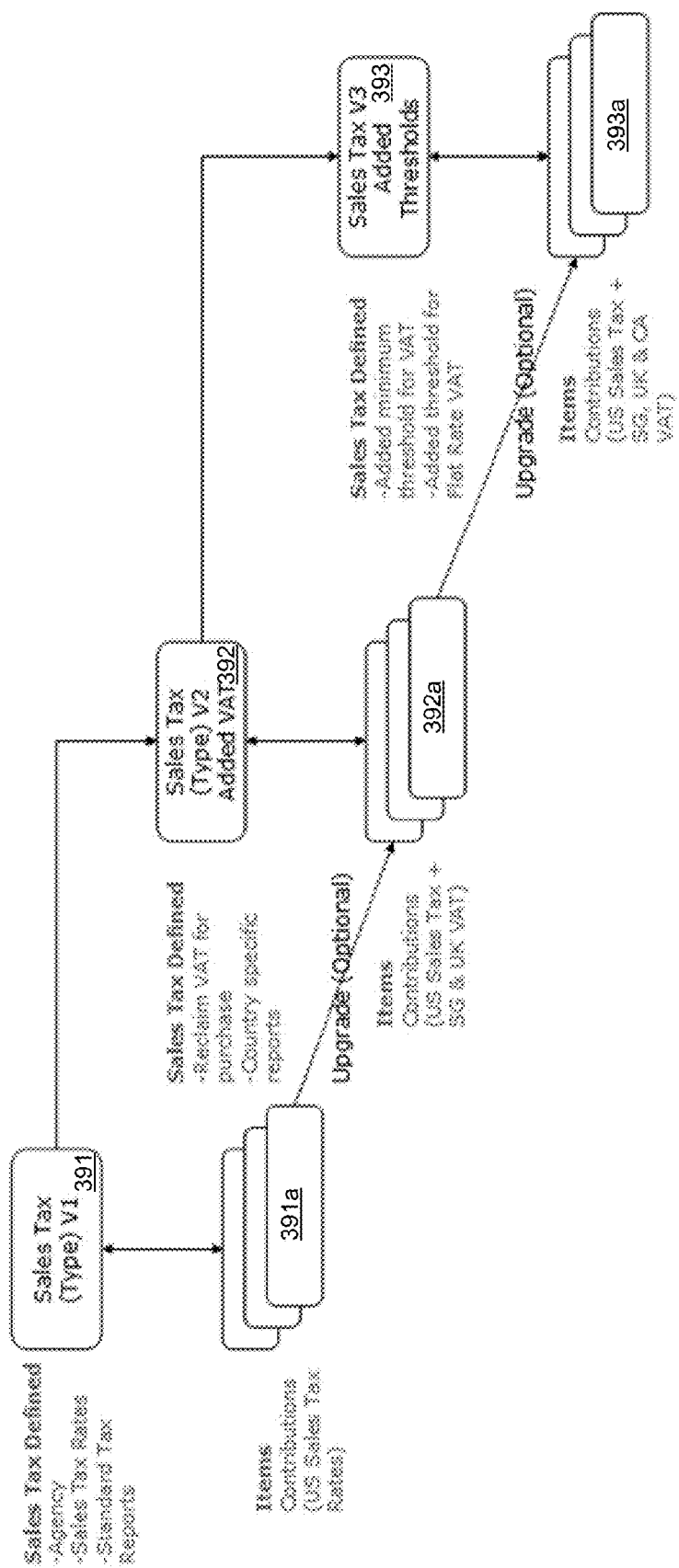

FIG. 3E shows an example of type node and item node in the graph model. The definition of the type node may be expanded to added additional information without impacting associated item nodes that represent contribution data items. On the other hand, the item nodes may be optionally upgraded and tracked using version nodes linked to the type node. For example, the type node (391) represents a seed user's contributed tax structure (version 1) of sales tax where agency, sales tax rates, and standard tax reports are specified. The associated item nodes (391a) include information regarding US sales tax rates that are contributed by users. In time, another seed user may contribute additional information causing the type node (391) to be expanded into the tax structure (version 2) where VAT information and country specific reports are included. The expanded type node is represented as the type node (392). The associated item nodes (392a) include information regarding VAT tax rates for the countries SG and UK. Subsequently, a third seed user may contribute additional information causing the type node (392) to be further expanded into the tax structure (version 3) where flat rate VAT information and country specific VAT thresholds are included. The expanded type node is represented as the type node (393). The associated item nodes (393a) include information regarding VAT flat tax rates for the country CA. Using the graph model, the information contributed by the user community may evolve over time.

FIGS. 4A-4D show an application example of implicit contribution based customization in accordance with one or more embodiments of the invention. This application example may be practiced using the system (100) of FIG. 1A and based on the method described with respect to FIG. 2B above.

Figure 4A:
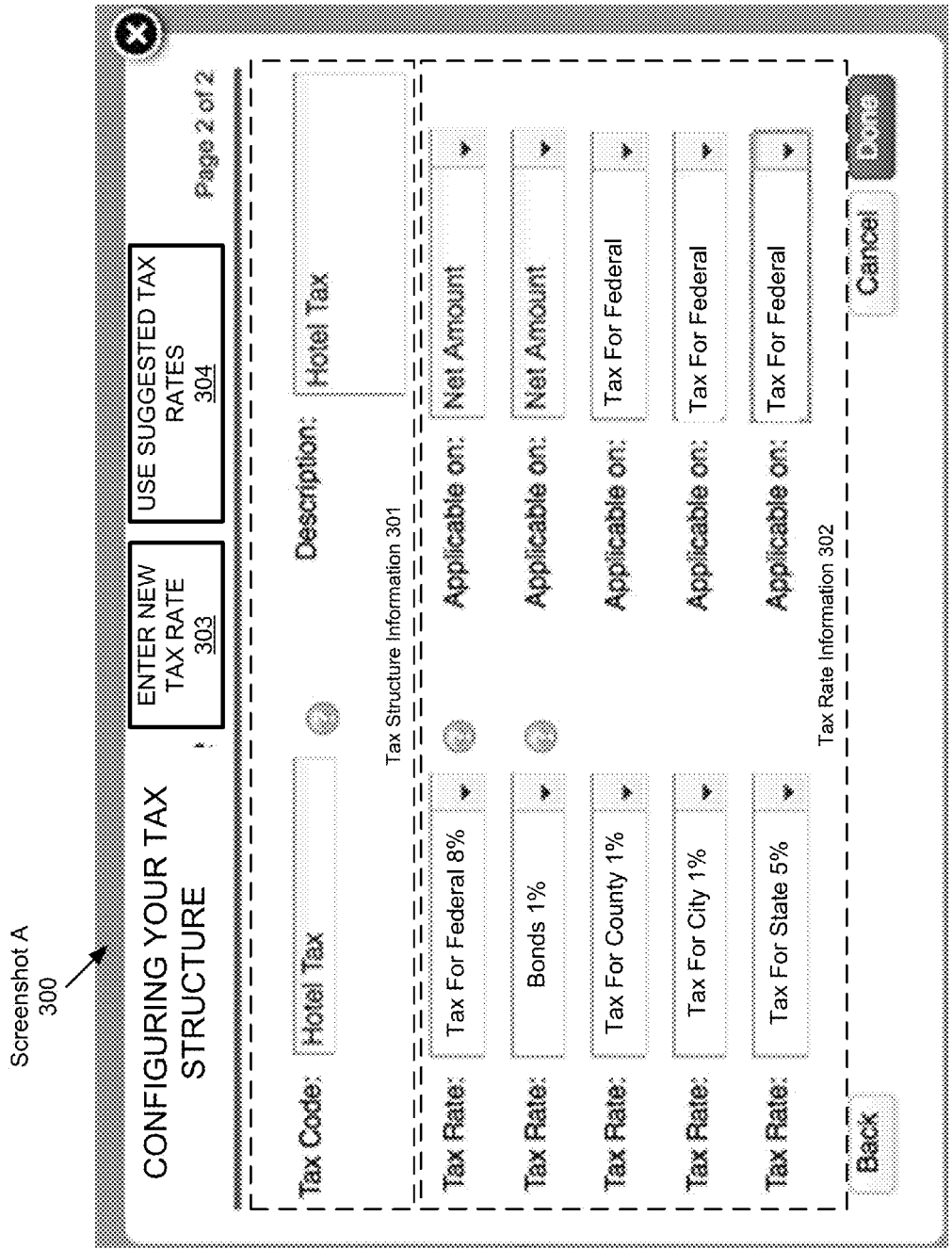
FIGS. 4A, 4B, 4C, and 4D show an example of implicit contribution based customization in accordance with one or more embodiments of the invention.

FIG. 4A shows a screenshot A (300) of a user interface menu in an accounting software. Specifically, the user interface menu allows a user (referred to as the new user) to configure the tax structure before performing any tax related tasks using the accounting software. In the scenario shown in the screenshot A (300), the new user has selected to create a new tax structure by activating the command button (303) "ENTER NEW TAX RATE." In response, the bottom panel is displayed requesting the user to enter tax rate information (302). As shown, the new user has specified that the entered tax rate information pertains to hotel tax and includes five different tax rates. Specifically, these five tax rates correspond to the example tax structure A (150) shown in FIG. 1C above. In this example, the first two tax rates are based on a net amount of the invoice transaction while the bottom three tax rates are based on the amount of tax for Federal, which is computed based on the first tax rate "Tax For Federal 8%." These dependencies are captured in the example tax structure A (150) based at least on the hierarchical structure therein. In other example where all tax rates are uniformly based on net transaction amount, the tax structure may be flat without any hierarchical structure.

Figure 4B:
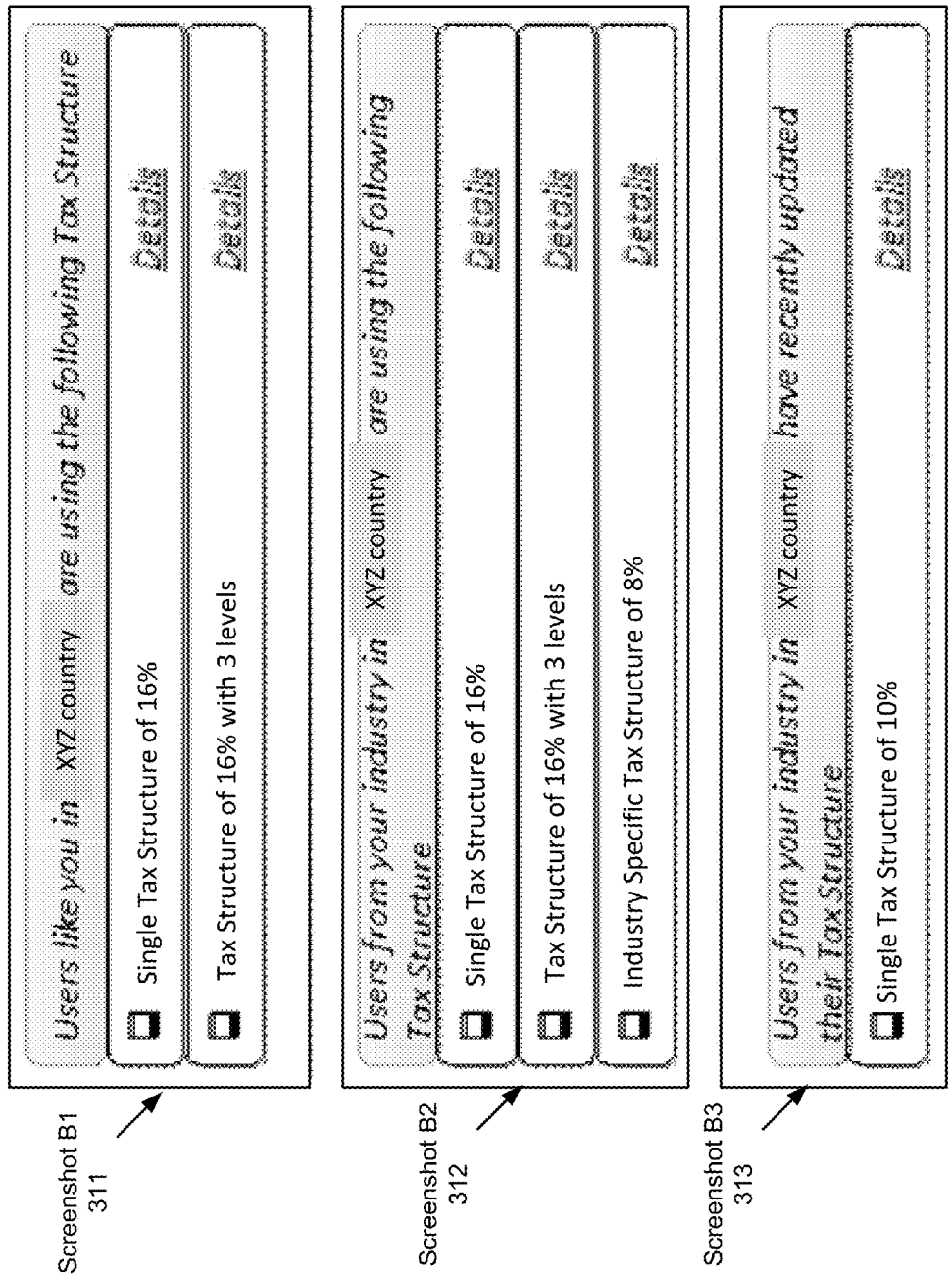

In a different scenario, the new user may select to adopt a system suggested tax structure by activating the command button (304) "USE SUGGESTED TAX RATES." In response, the new user is presented with a selection menu shown in FIG. 4B instead of the bottom panel requesting tax rate information (302).

In yet another scenario, the new user may search for a system suggested tax structure from another user interface menu of the software application. In response, the new user is presented with a selection menu shown in FIG. 4B to adopt a selected suggestion.

In still another scenario, the new user may have received a social network posting from a social network friend (e.g., another accountant user) that includes an embedded link regarding a system suggested tax structure. In particular, the embedded link includes the URL of a login page for the accounting software application and is concatenated with a reference to the particular system suggested tax structure. For example, this social network friend may be performing an accounting task using an instantiation of the accounting software and click a "share via social network" command button (not shown) included in a user interface menu of the accounting software instantiation. Clicking the "share via social network" command button causes the social network posting to be presented to the new user. When viewing this social network posting, the new user may click on the embedded link and get re-directed to the login page for the accounting software application. Once logged-in, the new user is presented with a selection menu shown in FIG. 4B to adopt a selected suggestion. In particular, the system suggested tax structure recommended by the social network friend is identified by the accounting software application from a community database based on the concatenated reference to the login page URL.

Generally, any user can create and/or adopt as many tax structures as necessary. For example, a hotel owner in Canada may specify three taxes: the federally-mandated GST (Goods and Services Tax in Canada that is similar to Federal Sales Tax in the U.S.), the provincially-mandated PST (Provincial Sales Tax in Canada that is similar State Sales Tax in the U.S.), and the provincially-mandated Hotel Tax. All three of these taxes are applicable to this user's sales of hotel rooms. However, only GST and HST need to be applied to sales of other items, such as meals or sundries. Therefore, the hotel owner user may create and/or adopt two separate tax structures.

FIG. 4B shows a screenshot B1 (311) of the selection menu where the new user may select one of two suggested tax structures that are suggested based on the new user's tax jurisdiction. The two selections may be applicable to different types of the transaction that the user may process. FIG. 4B also shows a screenshot B2 (312) of another selection menu where the new user may select one of three suggested tax structures that are suggested based on the new user's tax jurisdiction. Two of the selections may be applicable to different types of the transaction that the user may process, while the third selection allows the new user to use a tax structure customized for a specific industry. Although not specifically shown in FIG. 4B, the suggested tax structures may be suggested based on various attributes of the new user or activities performed (or to be performed) by the new user in the software application. The user attributes may include, but are not limited to professional designation of the user, geographical location of the user, tax jurisdiction of the user, job title of the user, industry of the user, goods/services provided or purchased by the user, income and/or expenses recorded or claimed by the user, assets and liabilities of the user, tax status of the user (e.g., self-reported tax status, registrations with tax agencies, exemptions from tax agencies, etc.), tax return filing count and/or frequency of the user, type of tax-related activities performed by the user in the software, length of time the user has been using the software application, number of times the user has logged into the software application, how long the user has been renewing the license of the software application, etc. The activities performed (or to be performed) by the new user in the software application may include, but are not limited to, pre-sales and sales activities (e.g., creating or recording a particular type of estimates, proposals, quotations, sales orders, invoices, receipts, statements, and/or other requests for payment), income activities (e.g., recording or itemizing a particular type of income and its sources), pre-purchase and purchase activities (e.g., creating or recording a particular type of purchase orders, bills, expenses, cheques, credit card, debit card, and/or other requests for and methods of payment), expense activities (e.g., recording or itemizing a particular type of expenses and their sources), and other activities, such as preparing a particular type of accounting report, preparing or reviewing a particular type of tax agency filing, etc.

In other words, the suggested tax structures may be based on tax structures used by other users sharing one or more of these attributes with the new user. Further, the suggested tax structures may be based on tax structures used by other users who have also performed one or more of these activities using the software application, as has been or will be performed by the new user.

After the new user has adopted one of the suggested tax structures, the new user may receive a notification alert that the adopted tax structure may have been recently updated by other users in the same tax jurisdiction. The screenshot B3 (313) shows an example of such notification where the user may adopt the updated tax structure by clicking on the line item in the notification to replace the previously adopted version. In each of the screenshot B1 (311), screenshot B2 (312), and screenshot B3 (313), the new user may view the tax structure by clicking on the command button labeled "Details." Accordingly, a graphical representation or other details such as the example tax structure A (150) shown in FIG. 1C may be presented to the new user. For example, other details may include data entry fields and command buttons allowing the new user to provide feedback and rate the system suggested tax structures.

Figure 4C:
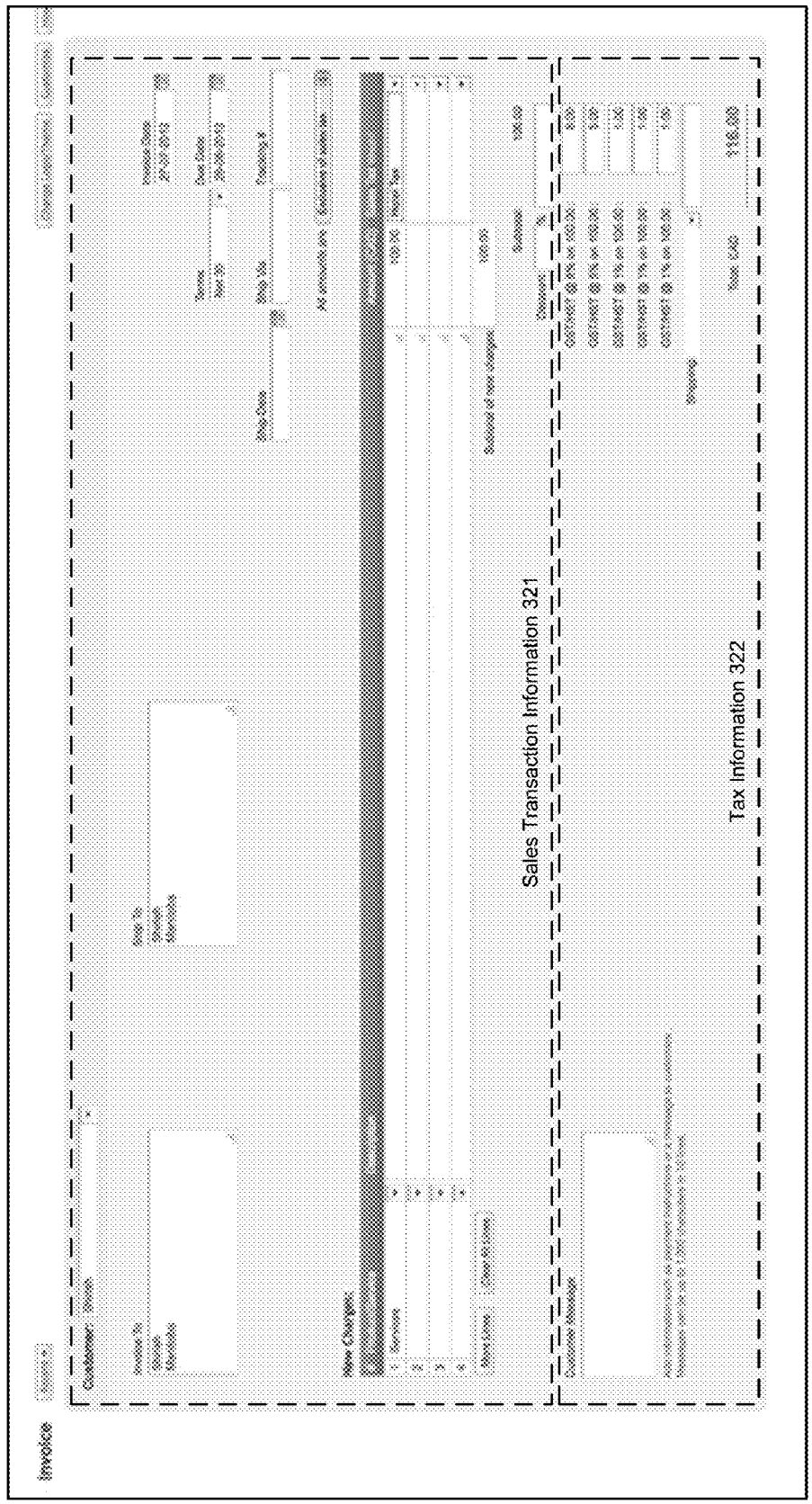

FIG. 4C shows a screenshot C (320) of a predetermined task generation menu of the accounting software application. As shown, in the example of FIG. 4C, the new user is generating an invoice after adopting the suggested tax structure or creating a new tax structure. The invoice generation menu includes a top panel where the new user enters sales transaction information (321) and a bottom panel displaying the tax information (322) computed by the accounting software application based on the tax structure adopted or created by the new user. Those skilled in the art will appreciate that the software application instantiation being used by the new user may perform other predetermined tasks, such as generation of other types of documents or reports, preparing tax filings, etc.

Figure 4D:
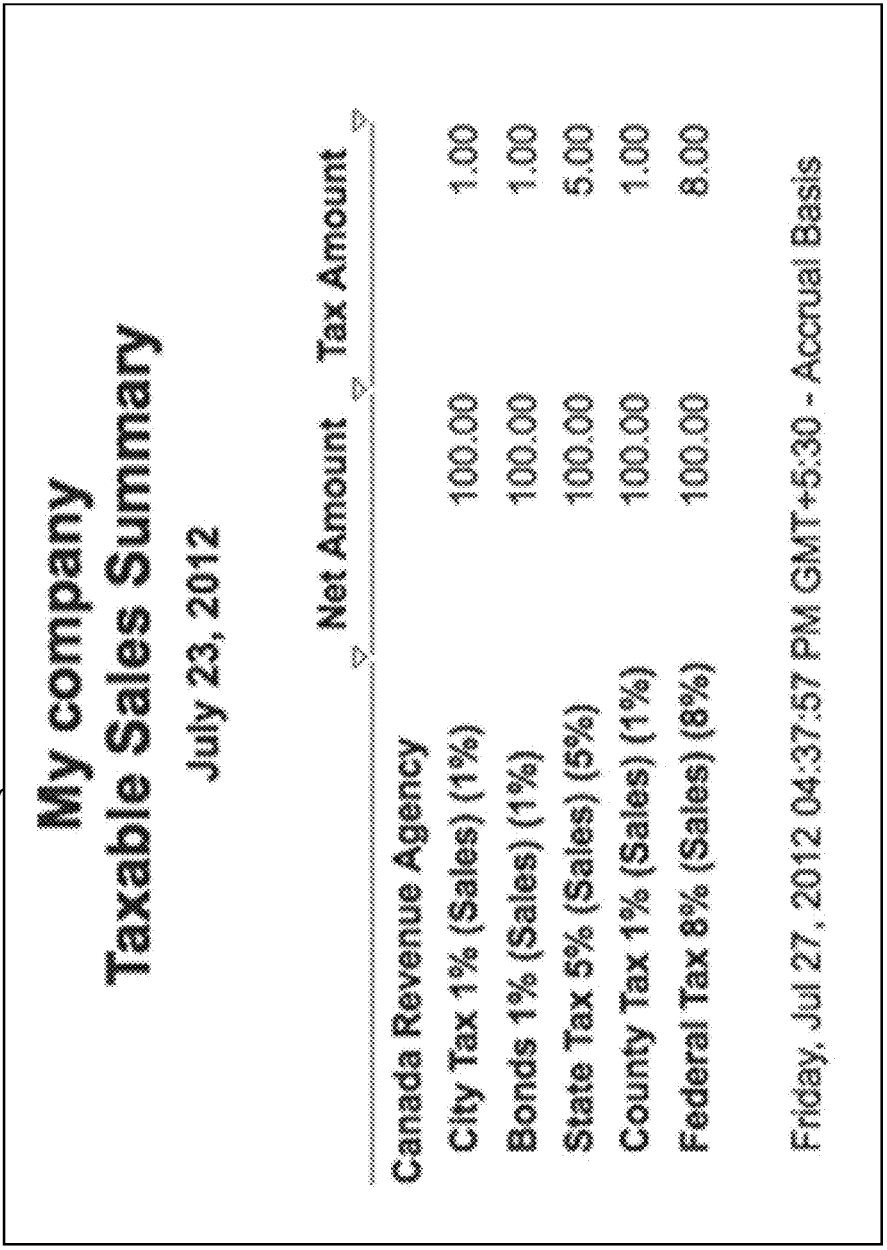

FIG. 4D shows a screenshot D (330) of a report menu of the accounting software application. As shown, the new user is preparing an accounting report after adopting the suggested tax structure or creating a new tax structure. The report menu displays the accounting report detailing tax amounts computed based on the tax rates of the tax structure adopted or created by the new user.

Although the example described in reference to the FIGS. 4A-4D above refers to the scenario when the new user is configuring the tax structure of the accounting software application, the example may also apply to a different scenario when an existing user is re-configuring the tax structure by either re-entering new tax rate information or adopting a suggested tax structure to replace the existing tax structure of the accounting software application.

Figure 5:
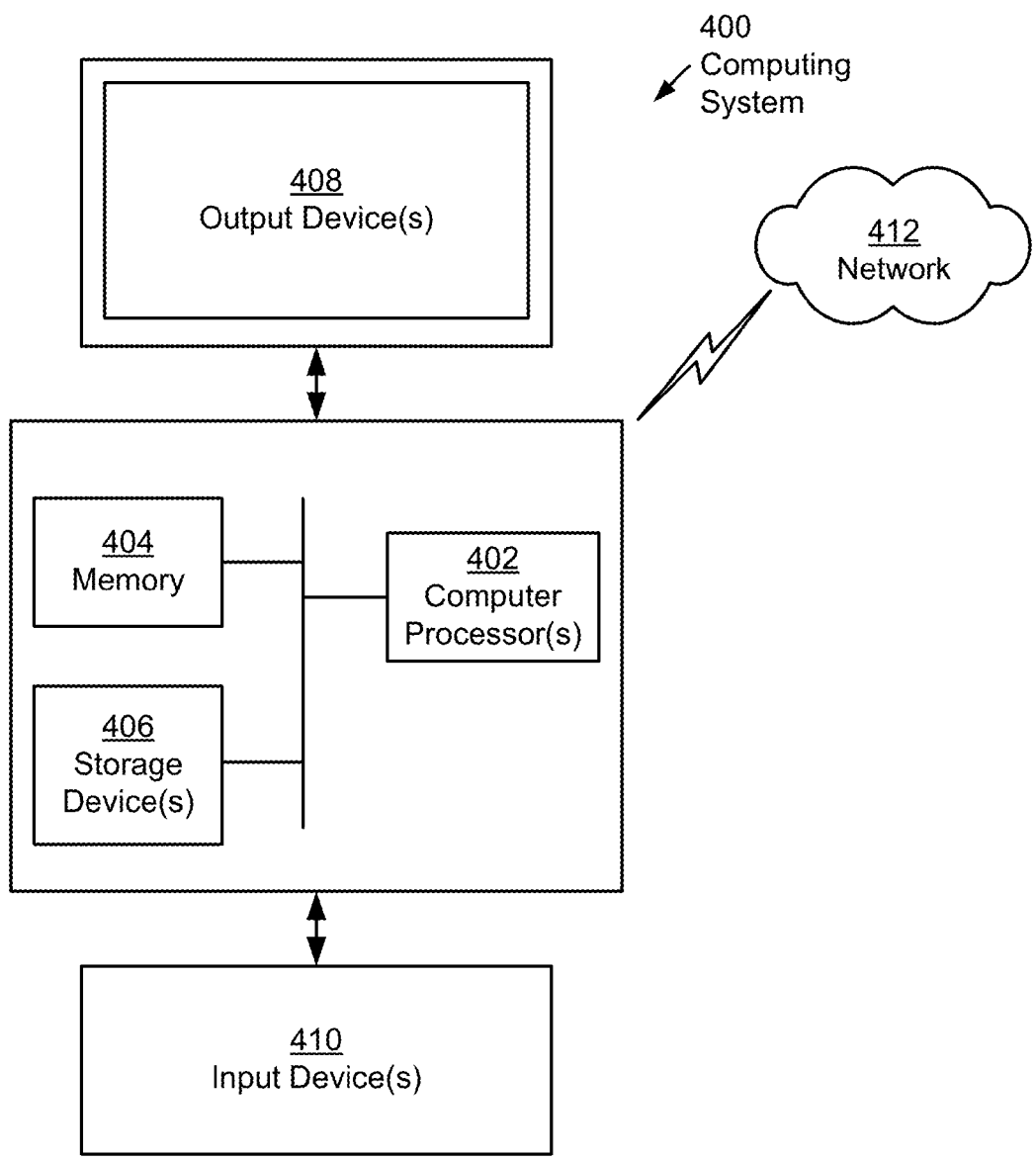
FIG. 5 shows a diagram of a computer system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 5, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device. The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (412). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or microcore of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method to customize an online software application, comprising:
    displaying, using a user interface of the online software application, a message inviting user contribution to a customizable component of the online software application;
    receiving, from an initial seed user via a network connection and in response to displaying the message, a structural specification of the customizable component suggested by the initial seed user according to a requirement based on an attribute of the initial seed user;
    determining that a new user of the online software application matches the attribute of the initial seed user;
    configuring, based on the structural specification of the customizable component suggested by the initial seed user, a first instantiation of a plurality of instantiations of the online software application for the new user to perform a pre-determined task according to the requirement;
    configuring, based on the structural specification of the customizable component, the plurality of instantiations of the online software application for a plurality of users to perform the pre-determined task;
    extracting, from the customizable component in each of the plurality of instantiations, a plurality of structured contents used by the plurality of users to further configure the plurality of instantiations for performing the pre-determined task;
    generating a statistical measure of the plurality of users using the plurality of instantiations to perform the pre-determined task, wherein the statistical measure comprises:
        a number of registered users, among the plurality of users, who have paid for the online software application;
        a number of users, among the plurality of users, who have performed the pre-determined task based on a same structured content;
        a number of users, among the plurality of users, who have performed the pre-determined task based on a shared pattern of the plurality of structured contents; and
        a number of times that the plurality of users have performed the pre-determined task based on the shared pattern;
    generating, in response to the statistical measure exceeding a pre-determined threshold, a suggested structured content to represent a portion of the plurality of structured contents that is qualified based on the statistical measure, wherein configuring the instantiation of the online software application for the new user is further based on the suggested structured content; and
    performing, using the first instantiation of the online software application and via the network connection, the pre-determined task for the new user.

2. The method of claim 1, further comprising:
    identifying a first geographical region based on the attribute of the initial seed user,
    wherein the pre-determined task for the new user is performed within the first geographical region, wherein determining that the new user matches the attribute of the initial seed user comprises determining that the new user is within the first geographical region, and
    wherein the pre-determined task for the plurality of users is performed within the first geographical region.

3. The method of claim 2, further comprising:
    displaying, using the user interface, a selection menu for the initial seed user to select from a plurality of geographical regions supported by the online software application; and
    receiving, from the initial seed user, a selection indicating that the geographical region is not yet supported by the online software application and is not included in the plurality of geographical regions,
    wherein displaying the message is in response to receiving the selection.

4. The method of claim 2,
    wherein a first structured content of the plurality of structured contents is used by a first user of the plurality of users to perform the pre-determined task,
    wherein a second structured content of the plurality of structured contents is used by a second user of the plurality of users to perform the pre-determined task, and
    wherein the first structured content and the second structured content correspond to different portions of the structural specification based on different industries of the first user and the second user.

5. The method of claim 2, further comprising:
    receiving, from a subsequent seed user and in response to displaying the message, a revision to the structural specification of the customizable component, wherein the revision is suggested by the subsequent seed user according to another requirement of a second geographical region;

configuring, for another plurality of users, another plurality of instantiations of the online software application based on the revision of the structural specification of the customizable component;

extracting, from the customizable component in each of the another plurality of instantiations, another plurality of structured contents used by the another plurality of users to further configure the another plurality of instantiations for performing the pre-determined task within the second geographical region;

generating another statistical measure of the another plurality of users using the another plurality of instantiations to perform the pre-determined task;

generating, in response to the another statistical measure exceeding the pre-determined threshold, another suggested structured content to represent another portion of the another plurality of structured contents that is qualified based on the another statistical measure; and configuring, based on the another suggested structured content and in response to at least determining that another new user of the online software application is within the second geographical region, another instantiation of the online software application for the another new user to perform the pre-determined task within the second geographical region.

6. The method of claim 5, further comprising:

identifying a type associated with the customizable component;

storing, in a community data repository, the structural specification of the customizable component suggested by the initial seed user as an explicit contribution;

storing, in the community data repository, the plurality of structured contents used by the plurality of users as a plurality of implicit contributions;

assigning an initial version of the type to the structural specification and the plurality of structured contents, wherein generating the suggested structured content comprises retrieving the structural specification and the plurality of structured contents from the community data repository based on the initial version of the type;

storing, in the community data repository, the revision to the structural specification of the customizable component suggested by the subsequent seed user as another explicit contribution;

storing, in the community data repository, the another plurality of structured contents used by the another plurality of users as another plurality of implicit contributions; and assigning a subsequent version of the type to the revision to structural specification and the another plurality of structured contents, wherein generating the another suggested structured content comprises retrieving the another structural specification and the another plurality of structured contents from the community data repository based on the subsequent version of the type.

7. A system to customize an online software application, comprising:

a computer server configured to execute a plurality of instantiations of the online software application;

a user device coupled to the computer server via a network connection, wherein the user device is configured to display, using a user interface of the software application, a message inviting user contribution to a customizable component of the software application;

a software application customizer executing on a computer processor and configured to:

receive, from the user device via the network connection and in response to displaying the message, a structural specification of the customizable component suggested by an initial seed user according to a requirement based on an attribute of the initial seed user;

determine that a new user of the online software application matches the attribute of the initial seed user;

configure, based on the structural specification of the customizable component suggested by the initial seed user, a first instantiation of a plurality of instantiations of the online software application for the new user to perform a pre-determined task according to the requirement;

configure, based on the structural specification of the customizable component, the plurality of instantiations of the online software application for a plurality of users to perform the pre-determined task;

extract, from the customizable component in each of the plurality of instantiations, a plurality of structured contents used by the plurality of users to further configure the plurality of instantiations for performing the pre-determined task;

generate a statistical measure of the plurality of users using the plurality of instantiations to perform the pre-determined task, wherein the statistical measure comprises:

a number of registered users, among the plurality of users, who have paid for the online software application;

a number of users, among the plurality of users, who have performed the pre-determined task based on a same structured content;

a number of users, among the plurality of users, who have performed the pre-determined task based on a shared pattern of the plurality of structured contents; and a number of times that the plurality of users have performed the pre-determined task based on the shared pattern;

generate, in response to the statistical measure exceeding a pre-determined threshold, a suggested structured content to represent a portion of the plurality of structured contents that is qualified based on the statistical measure, wherein configuring the instantiation of the online software application for the new user is further based on the suggested structured content; and perform, using the first instantiation of the online software application and via the network connection, the pre-determined task for the new user; and a community data repository configured to store the structural specification and the plurality of structured contents.

8. The system of claim 7, the software application customizer further configured to:

identify a first geographical region based on the attribute of the initial seed user, wherein the computer server is further configured to perform, using the instantiation of the online software application and via the network connection, the pre-determined task for the new user within the first geographical region, wherein determining that the new user matches the attribute of the initial seed user comprises determining that the new user is within the first geographical region, and wherein the computer server is further configured to perform, using the plurality of instantiations of the online software application and via the network connection, the pre-determined task for the plurality of users within the first geographical region.

9. The system of claim 8, the user device further configured to:
  display, using the user interface, a selection menu for the initial seed user to select from a plurality of geographical regions supported by the software application; and
  receive, from the initial seed user, a selection indicating that the geographical region is not yet supported by the software application and is not included in the plurality of geographical regions,
  wherein displaying the message is in response to receiving the selection.

10. The system of claim 8,
  wherein a first structured content of the plurality of structured contents is used by a first user of the plurality of users to perform the pre-determined task,
  wherein a second structured content of the plurality of structured contents is used by a second user of the plurality of users to perform the pre-determined task, and
  wherein the first structured content and the second structured content correspond to different portions of the structural specification based on different attributes of the first user and the second user.

11. The system of claim 8, the software application customizer further configured to:
  receive, from a subsequent seed user and in response to displaying the message to the subsequent seed user, a revision to the structural specification of the customizable component, wherein the revision is suggested by the subsequent seed user according to another requirement of a second geographical region;
  configure, for another plurality of users, another plurality of instantiations of the software application based on the revision of the structural specification of the customizable component;
  extract, from the customizable component in each of the another plurality of instantiations, another plurality of structured contents used by the another plurality of users to further configure the another plurality of instantiations for performing the pre-determined task within the second geographical region;
  generate another statistical measure of the another plurality of users using the another plurality of instantiations to perform the pre-determined task;
  generate, in response to the another statistical measure exceeding the pre-determined threshold, another suggested structured content to represent another portion of the another plurality of structured contents that is qualified based on the another statistical measure; and
  configure, based on the another suggested structured content and in response to at least determining that another new user of the software application is within the second geographical region, another instantiation of the software application for the another new user to perform the pre-determined task within the second geographical region.

12. The system of claim 11, the software application customizer further configured to:
  identify a type associated with the customizable component;
  store, in the community data repository, the structural specification of the customizable component suggested by the initial seed user as an explicit contribution;
  store, in the community data repository, the plurality of structured contents used by the plurality of users as a plurality of implicit contributions;
  assign an initial version of the type to the structural specification and the plurality of structured contents, wherein generating the suggested structured content comprises retrieving the structural specification and the plurality of structured contents from the community data repository based on the initial version of the type;
  store, in the community data repository, the revision to the structural specification of the customizable component suggested by the subsequent seed user as another explicit contribution;
  store, in the community data repository, the another plurality of structured contents used by the another plurality of users as another plurality of implicit contributions; and
  assign a subsequent version of the type to the revision to structural specification and the another plurality of structured contents, wherein generating the another suggested structured content comprises retrieving the another structural specification and the another plurality of structured contents from the community data repository based on the subsequent version of the type.

13. A non-transitory computer readable medium storing instructions to customize a software application, the instructions, when executed by a computer processor, comprising functionality for:
  displaying, using a user interface of the online software application, a message inviting user contribution to a customizable component of the online software application;
  receiving, from an initial seed user via a network connection and in response to displaying the message, a structural specification of the customizable component suggested by the initial seed user according to a requirement based on an attribute of the initial seed user;
  determining that a new user of the online software application matches the attribute of the initial seed user;
  configuring, based on the structural specification of the customizable component suggested by the initial seed user, a first instantiation of a plurality of instantiations of the online software application for the new user to perform a pre-determined task according to the requirement;
  configuring, based on the structural specification of the customizable component, the plurality of instantiations of the online software application for a plurality of users to perform the pre-determined task;
  extracting, from the customizable component in each of the plurality of instantiations, a plurality of structured contents used by the plurality of users to further configure the plurality of instantiations for performing the pre-determined task;
  generating a statistical measure of the plurality of users using the plurality of instantiations to perform the pre-determined task, wherein the statistical measure comprises:
    a number of registered users, among the plurality of users, who have paid for the online software application;
    a number of users, among the plurality of users, who have performed the pre-determined task based on a same structured content;

a number of users, among the plurality of users, who have performed the pre-determined task based on a shared pattern of the plurality of structured contents; and a number of times that the plurality of users have performed the pre-determined task based on the shared pattern;

generating, in response to the statistical measure exceeding a pre-determined threshold, a suggested structured content to represent a portion of the plurality of structured contents that is qualified based on the statistical measure, wherein configuring the instantiation of the online software application for the new user is further based on the suggested structured content; and performing, using the first instantiation of the online software application and via the network connection, the pre-determined task for the new user.

14. The non-transitory computer readable medium of claim 13, the instructions, when executed by the computer processor, further comprising functionality for:

identifying a first geographical region based on the attribute of the initial seed user, wherein the pre-determined task for the new user is performed within the first geographical region, wherein determining that the new user matches the attribute of the initial seed user comprises determining that the new user is within the first geographical region, and wherein the pre-determined task for the plurality of users is performed within the first geographical region.

15. The non-transitory computer readable medium of claim 14, the instructions, when executed by the computer processor, further comprising functionality for:

displaying, using the user interface, a selection menu for the initial seed user to select from a plurality of geographical regions supported by the online software application; and receiving, from the initial seed user, a selection indicating that the geographical region is not yet supported by the online software application and is not included in the plurality of geographical regions, wherein displaying the message is in response to receiving the selection.

16. The non-transitory computer readable medium of claim 14, wherein a first structured content of the plurality of structured contents is used by a first user of the plurality of users to perform the pre-determined task, wherein a second structured content of the plurality of structured contents is used by a second user of the plurality of users to perform the pre-determined task, and wherein the first structured content and the second structured content correspond to different portions of the structural specification based on different industries of the first user and the second user.

17. The non-transitory computer readable medium of claim 14, the instructions, when executed by the computer processor, further comprising functionality for:

receiving, from a subsequent seed user and in response to displaying the message, a revision to the structural specification of the customizable component, wherein the revision is suggested by the subsequent seed user according to another requirement of a second geographical region;

configuring, for another plurality of users, another plurality of instantiations of the online software application based on the revision of the structural specification of the customizable component;

extracting, from the customizable component in each of the another plurality of instantiations, another plurality of structured contents used by the another plurality of users to further configure the another plurality of instantiations for performing the pre-determined task within the second geographical region;

generating another statistical measure of the another plurality of users using the another plurality of instantiations to perform the pre-determined task;

generating, in response to the another statistical measure exceeding the pre-determined threshold, another suggested structured content to represent another portion of the another plurality of structured contents that is qualified based on the another statistical measure; and configuring, based on the another suggested structured content and in response to at least determining that another new user of the online software application is within the second geographical region, another instantiation of the online software application for the another new user to perform the pre-determined task within the second geographical region.

* * * * *